United States Patent
Ichino et al.

(10) Patent No.: US 11,421,089 B2
(45) Date of Patent: Aug. 23, 2022

(54) PREPREG SHEET, METHOD FOR MANUFACTURING SAME, UNIT LAYER WITH A COVERING MATERIAL, METHOD FOR MANUFACTURING FIBER-REINFORCED COMPOSITE, AND FIBER-REINFORCED COMPOSITE

(71) Applicant: Mitsubishi Chemical Corporation, Chiyoda-ku (JP)

(72) Inventors: Masahiro Ichino, Chiyoda-ku (JP); Kazuhisa Ikeda, Chiyoda-ku (JP); Satoshi Okamoto, Chiyoda-ku (JP); Yuma Furuhashi, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 301 days.

(21) Appl. No.: 16/585,869

(22) Filed: Sep. 27, 2019

(65) Prior Publication Data
US 2020/0024414 A1    Jan. 23, 2020

Related U.S. Application Data

(63) Continuation of application No. PCT/JP2018/013835, filed on Mar. 30, 2018.

(30) Foreign Application Priority Data

Mar. 31, 2017  (JP) .............................. JP2017-073012

(51) Int. Cl.
    *C08J 5/24*     (2006.01)
    *C08J 5/04*     (2006.01)
    *C08J 5/18*     (2006.01)

(52) U.S. Cl.
    CPC ................. *C08J 5/24* (2013.01); *C08J 5/042* (2013.01); *C08J 5/18* (2013.01); *C08J 2323/12* (2013.01);
    (Continued)

(58) Field of Classification Search
    CPC ......... B29C 43/02; B29C 43/18; B29C 70/22; B29C 70/34; B23B 2260/023;
    (Continued)

(56) References Cited

U.S. PATENT DOCUMENTS

| 5,397,415 A | * | 3/1995 | Manabe | ................... B26D 3/08 |
| | | | | 156/234 |
| 2002/0059976 A1 | | 5/2002 | Taggart | |

(Continued)

FOREIGN PATENT DOCUMENTS

| CN | 103079799 A | 5/2013 |
| CN | 104755240 A | 7/2015 |

(Continued)

OTHER PUBLICATIONS

Combined Chinese Office Action and Search Report dated Aug. 11, 2021 in Chinese Patent Application No. 201880021123.X (with unedited computer generated English translation), 15 pages.

(Continued)

*Primary Examiner* — Camie S Thompson
(74) *Attorney, Agent, or Firm* — Oblon, McClelland, Maier & Neustadt, L.L.P.

(57) ABSTRACT

A prepreg sheet (1) is formed by stacking a plurality of unit layers (10a, 10b) In the unit layers (10a, 10b), prepreg tapes (100), in which a reinforced fiber bundle is impregnated with a thermosetting matrix resin composition, are disposed in rows a plurality of times. One or more of the unit layers (10a, 10b) has a gap (G) between adjacent prepreg tapes (100), and the width thereof is 10% or less of the width of the narrower of the adjacent prepreg tapes (100).

18 Claims, 3 Drawing Sheets

(52) U.S. Cl.
CPC ........ *C08J 2325/18* (2013.01); *C08J 2341/00* (2013.01); *C08J 2377/00* (2013.01)

(58) Field of Classification Search
CPC ..... B23B 2260/046; B23B 27/12; B23B 5/26; C08J 5/24; C08J 5/042; C08J 5/18
USPC .............................. 428/107, 297.4; 264/258
See application file for complete search history.

(56) References Cited

U.S. PATENT DOCUMENTS

| | | |
|---|---|---|
| 2003/0217802 A1 | 11/2003 | Taggart |
| 2005/0236093 A1 | 10/2005 | Taggart |
| 2007/0029038 A1 | 2/2007 | Brown et al. |
| 2007/0099527 A1* | 5/2007 | Brun ................ C04B 35/62873 442/185 |
| 2007/0218795 A1 | 9/2007 | Taggart |
| 2010/0078845 A1 | 4/2010 | Guzman et al. |
| 2013/0033745 A1 | 2/2013 | Sekine et al. |
| 2013/0122277 A1 | 5/2013 | Ellis et al. |
| 2013/0337230 A1 | 12/2013 | Wilenski et al. |
| 2014/0049814 A1 | 2/2014 | Sekine et al. |
| 2014/0057096 A1 | 2/2014 | Moser |
| 2014/0352838 A1 | 12/2014 | Yoon et al. |
| 2015/0017853 A1 | 1/2015 | Perillat-Collomb et al. |
| 2015/0030803 A1 | 1/2015 | Butler et al. |
| 2015/0129128 A1 | 5/2015 | Ellis et al. |
| 2015/0283730 A1 | 10/2015 | Kakimoto |
| 2016/0136925 A1 | 5/2016 | Chamberlain et al. |

FOREIGN PATENT DOCUMENTS

| | | |
|---|---|---|
| CN | 105431286 A | 3/2016 |
| CN | 105818401 A | 8/2016 |
| EP | 2 915 645 A1 | 9/2015 |
| JP | 11-107107 A | 4/1999 |
| JP | 2004-504962 A | 2/2004 |
| JP | 2004-315804 A | 11/2004 |
| JP | 2006-63130 A | 3/2006 |
| JP | 2007-1089 A | 1/2007 |
| JP | 2012-504183 A | 2/2012 |
| JP | 2012-201716 A | 10/2012 |
| JP | 2013-107385 A | 6/2013 |
| JP | 2013-538264 A | 10/2013 |
| JP | 2014-808 A | 1/2014 |
| JP | 2014-55258 A | 3/2014 |
| JP | 2016-525471 A | 8/2016 |
| JP | 2016-526116 A | 9/2016 |
| WO | WO 2012/020109 A2 | 2/2012 |
| WO | WO 2014/069503 A1 | 5/2014 |

OTHER PUBLICATIONS

"Fundamentals of Materials Science and Engineering", Wu Yun-shu et al., Mechanical Industry Press, first edition, Oct. 1990, pp. 203-205 (with English translation).
Extended European Search Report dated Mar. 20, 2020 in Patent Application No. 18774885.0, 11 pages.
Office Action dated Nov. 26, 2019 in corresponding Japanese Patent Application No. 2018-517905 (with English Translation), 10 pages.
International Search Report dated Jun. 19, 2018 in PCT/JP2018/013835, 2 pages.
International Preliminary Report on Patentability dated Oct. 10, 2019 in PCT/JP2018/013835, 8 pages (submitting English translation only).
Office Action dated Mar. 5, 2019 in Japanese Patent Application No. 2018/517905, 8 pages (with unedited computer generated English translation).
Chinese Office Action dated Jan. 7, 2022 in Chinese Patent Application No. 201880021123.X (with English translation), 13 pages.
European Office Action dated Dec. 9, 2021 in European Patent Application No. 18774885.0, 10 pages.

* cited by examiner

PREPREG SHEET, METHOD FOR MANUFACTURING SAME, UNIT LAYER WITH A COVERING MATERIAL, METHOD FOR MANUFACTURING FIBER-REINFORCED COMPOSITE, AND FIBER-REINFORCED COMPOSITE

TECHNICAL FIELD

The present invention relates to a prepreg sheet, a method for manufacturing the same, a unit layer with a covering material, a method for manufacturing a fiber-reinforced composite, and a fiber-reinforced composite.

BACKGROUND ART

A prepreg in a sheet form is an intermediate base material in which a thermosetting matrix resin is impregnated in a sheet form material including reinforced fibers unidirectionally aligned, a fabric, a non-woven cloth, or the like is generally used for manufacturing a fiber-reinforced composite.

In Patent Document 1, a method is disclosed in which a sheet-like fiber bundle including a plurality of reinforced fibers aligned in parallel is formed into a reinforced fiber sheet by arranging lateral end portions adjacent to each other in a horizontal direction to overlap each other, and a resin composition is impregnated in the reinforced fiber sheet, and thus, a prepreg is manufactured.

On the other hand, a narrow intermediate base material referred to as a tow prepreg, a yarn prepreg, or a strand prepreg (hereinafter, may be referred to as a tow prepreg) in which a thermosetting matrix resin is impregnated in a reinforced fiber bundle including thousands to tens of thousands of filaments unidirectionally arranged n is used for manufacturing the fiber-reinforced composite, other than the sheet-like prepreg.

In Patent Document 2, a method for manufacturing a fiber-reinforced composite is proposed in which a reinforced material is flatly laid and is regarded as a sheet-like prepreg, and is used in infusion molding or stamping molding.

In Patent Document 3, a method for molding a fiber-reinforced thermoplastic composite by using a fiber-reinforced thermoplastic prepreg tape in which a thermoplastic resin is impregnated in a continuous reinforced fiber is disclosed. In this method, the prepreg tapes are laid up in a certain direction for each layer, and the layers are laminated, in which the orientations of the reinforced fibers in each layer are different. Then, the obtained multiaxially laminated sheets are integrated by stitching, the multiaxially laminated sheets that are integrated are cut or laminated, are provided in a mold, and are molded into a predetermined shape.

In Patent Document 4, a method for manufacturing an advanced grid structure that is molded by arranging a tape prepreg in a grid-like groove formed in a metal mold, and by heating the tape prepreg under a pressure is disclosed. The grid-like groove is configured of a groove that extends in three directions. The groove that extends in three directions is formed to be thick at an intersection, and is formed to be thin in other portions. The tape prepreg is arranged in the groove without being folded back in a width direction at the intersection, and is arranged by being folded back in the width direction in the other portions. In addition, the tape prepreg is arranged at the intersection such that three sets of two tape prepregs intersecting with each other are in contact with each other at one point.

In Patent Document 5, it is described that tape-like prepregs of which a width is 2.0 mm to 3000 mm, and a difference between a maximum width and a minimum width along a length is controlled such that the difference is less than 0.20 mm are used by being laid down to be parallel to each other at an interval of less than a predetermined width. A gap between the tape prepregs that are laid down is less than 1.00 mm.

CITATION LIST

Patent Document

Patent Document 1: Japanese Unexamined Patent Application Publication "JP 2012-201716 A (published Oct. 22, 2012)"
Patent Document 2: PCT Japanese Translation Patent Publication "JP 2004-504962 W (published Feb. 19, 2004)"
Patent Document 3: Japanese Unexamined Patent Application Publication "JP 2007-001089 A (published Jan. 11, 2007)"
Patent Document 4: Japanese Unexamined Patent Application Publication "JP 2013-107385 A (published Jun. 6, 2013)"
Patent Document 5: International Publication "WO 2012/020109 A (published Feb. 16, 2012)"

SUMMARY OF THE INVENTION

Problem to be Solved by the Invention

However, in a case where a plurality of tape-like prepregs are arranged, and a stereo shaped molded article is manufactured by a press molding, the movement of the prepreg tape is hindered by adjacent tapes or the overlapping tapes when the tape is moving along with the stereoscopic shape of the molded article, and thus, wrinkles on the molded article to be appeared or fiber meandering easily occurs. As a result thereof, there is a case where the strength of the molded article is impaired or it is difficult to obtain a desired stereoscopic molded article.

The invention has been made in consideration of the problems described above, and an object thereof is to provide a prepreg sheet that is capable of suppressing the occurrence of wrinkles and reinforced fiber meandering at the time of molding, and is excellent in molding properties.

Means for Solving Problem

In order to attain the object described above, one aspect of the invention is a prepreg sheet formed by laminating a plurality of unit layers including a plurality of arranged prepreg tapes in which a matrix resin composition is impregnated in a reinforced fiber bundle, in which at least one unit layer has a gap between the adjacent prepreg tapes, and a width of the gap is narrower than or equal to 10% of the width of the adjacent prepreg tapes whichever is narrower.

In addition, in order to attain the object described above, one aspect of the invention is a unit layer with a covering material, including: a covering material; and a unit layer that is arranged on the covering material, in which in the unit layer, a plurality of prepreg tapes are arranged with a gap, the prepreg tape contains a reinforced fiber bundle and a matrix resin composition, and a width of the gap is narrower than or equal to 10% of the width of the adjacent prepreg tapes whichever is narrower.

Effect of the Invention

According to one aspect of the invention, it is possible to provide a prepreg sheet that is capable of suppressing the occurrence of wrinkles and reinforced fiber meandering at the time of molding, and is excellent in molding properties. In addition, by molding the prepreg sheet according to one aspect of the invention, an effect is obtained in which it is possible to provide a fiber-reinforced composite with excellent appearance.

MODE(S) FOR CARRYING OUT THE INVENTION

[1. Prepreg Sheet]

One aspect of the invention relates to a prepreg sheet formed by laminating a plurality of unit layers including a plurality of arranged prepreg tapes in which a matrix resin composition is impregnated in a reinforced fiber bundle. At least one unit layer of the plurality of unit layers that are laminated has a gap between the adjacent prepreg tapes, and the width of the gap is narrower than or equal to 10% of the width of the adjacent prepreg tapes whichever is narrower. The plurality of unit layers may include the prepreg tape that is oriented in a direction intersecting with an orientation direction of the prepreg tape of the unit layer directly above or directly below. Accordingly, it is possible to obtain a prepreg sheet that is capable of suppressing the occurrence of wrinkles and reinforced fiber meandering at the time of molding, and is excellent in molding properties. In addition, it is possible to manufacture a fiber-reinforced composite with excellent appearance by using such a prepreg sheet.

(Configuration of Prepreg Sheet)

Figure 1:
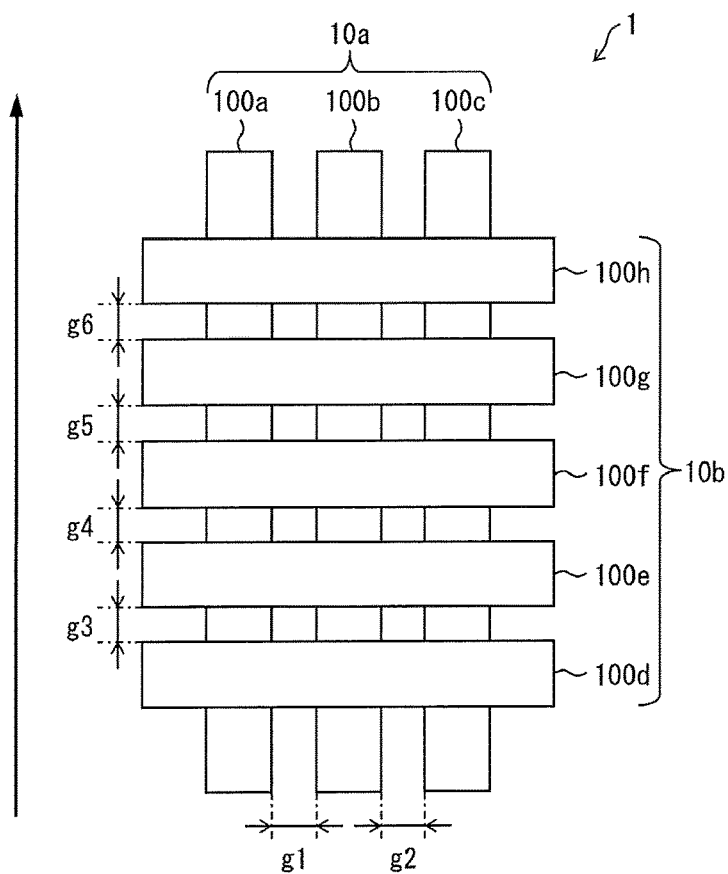
FIG. 1 is a top view illustrating a schematic configuration of a prepreg sheet according to Embodiment 1 of the invention.

Hereinafter, the configuration of a prepreg sheet 1 according to a first embodiment of the invention will be described in detail with reference to the drawings. FIG. 1 is a top view illustrating a schematic configuration of the prepreg sheet 1. The prepreg sheet 1 has a configuration in which a unit layer 10*a* and a unit layer 10*b* including a plurality of arranged prepreg tapes 100 are laminated. The details of the "prepreg tape" will be described below.

The unit layer 10*a* and the unit layer 10*b* have a gap of a predetermined width between the adjacent prepreg tapes 100, and the width of the gap is narrower than or equal to 10% of adjacent prepreg tapes 100 whichever is narrower. Specifically, in the unit layer 10*a*, the width of a gap g1 between adjacent prepreg tapes 100*a* and 100*b* is narrower than or equal to 10% of the width of the prepreg tapes 100*a* and 100*b* whichever is narrower. Similarly, the width of the other gap (g2 to g6) of the unit layer 10*a* and the unit layer 10*b* is also narrower or equal to 10% of the width of the adjacent prepreg tapes 100 whichever is narrower.

The prepreg sheet 1 has gaps g1 to g6 between the adjacent prepreg tapes 100. Owing to the gaps g1 to g6, the prepreg tapes 100 in the same unit layer are not restrained, and thus, the prepreg sheet is not rigid but has excellent drape properties. In addition, the prepreg tape 100 is easily moved, and thus, it is possible for each of the prepreg tapes 100 to be moved along with the shape of a preforming mold or a mold during preforming or molding. For this reason, the prepreg sheet 1 has excellent following properties with respect to the shape of a mold (preforming properties and molding properties). In addition, the gaps g1 to g6 are capable of functioning as a flow path of a resin flow that is locally generated while the prepreg sheet 1 is molded, and thus, the resin is capable of passing through the flow path but not an interface between the mold and the sheet surface. Accordingly, it is possible to prevent the reinforced fiber from flowing and meandering as the resin flows through the interface between the mold and the sheet surface. Accordingly, in the prepreg sheet 1, it is difficult for the wrinkles and the reinforced fiber meandering to occur at the time of molding.

In addition, in the prepreg sheet 1, the width of the gaps g1 to g6 is narrower than or equal to 10% of the width of the adjacent prepreg tapes 100 whichever is narrower. According to such a configuration, as with reasons described below, the prepreg sheet 1 is excellent in both of shape retention properties and drape properties of the sheet. As a result thereof, the prepreg sheet 1 is excellent in handling properties. Further, in a case where the width of the gaps g1 to g6 is within the range described above, in the molded article in which the prepreg sheet 1 is molded, the fiber flows, and the gap disappears. As a result thereof, mechanical properties of the molded article are excellent.

In a case where a direction represented by an arrow in the drawing is set to 0°, prepreg tapes 100*a* to 100*c* of the unit layer 10*a* are arranged to be oriented in a direction of 0° (the direction represented by the arrow in the drawing). Prepreg tapes 100*d* to 100*h* of the unit layer 10*b* are arranged to be oriented in a direction of 90°. The prepreg tapes 100*d* to 100*h* of the unit layer 10*b* respectively arranged to be oriented in a direction intersecting with an orientation direction of the prepreg tapes 100*a* to 100*c* of the unit layer 10*a* at an angle of 90°. According to such a configuration, it is possible to make the prepreg sheet 1 self-standing. As a result thereof, the prepreg sheet 1 is excellent in the handling properties. Furthermore, herein, the "orientation direction" indicates a longitudinal direction of the prepreg tape.

Each of the unit layers 10*a* and 10*b* has the gap, and thus, the prepreg tape 100 of each of the unit layers includes a region that overlaps the prepreg tape 100 of the other unit layer, and a region that does not overlap the prepreg tape 100 of the other unit layer. Specifically, in the prepreg tape 100 of the unit layer 10*a*, a region that overlaps the gap of the unit layer 10*b* is a region that does not overlap the prepreg tape 100 of the unit layer 10*b*. In such a region, the prepreg tape 100 of the unit layer 10*a* is not restrained by the prepreg tape 100 of the unit layer 10*b*. On the other hand, in the prepreg tape 100 of the unit layer 10*a*, the prepreg tape 100 of the unit layer 10*a* is restrained by the prepreg tape 100 of the unit layer 10*b* in the region that overlaps the prepreg tape 100 of the unit layer 10*b*. Herein, in the prepreg tape 100 of each of the unit layers, the region that does not overlap the prepreg tape 100 of the other unit layer will be referred to as an "unrestrained region", and in the prepreg tape 100 of each of the unit layer, the region that overlaps the prepreg tape 100 of the other unit layer will be referred to as a "restrained region".

As described above, the gaps g1 to g6 cause the unrestrained region to be generated in the prepreg tape 100 of the other unit layer directly above or directly below. For this reason, the gaps g1 to g6 not only suppress the occurrence of the wrinkles due to dragging that occurs by dividing the movement of the prepreg tapes 100 in the same unit layer, but also contributes to the deformation of the prepreg tape 100.

Figure 2:
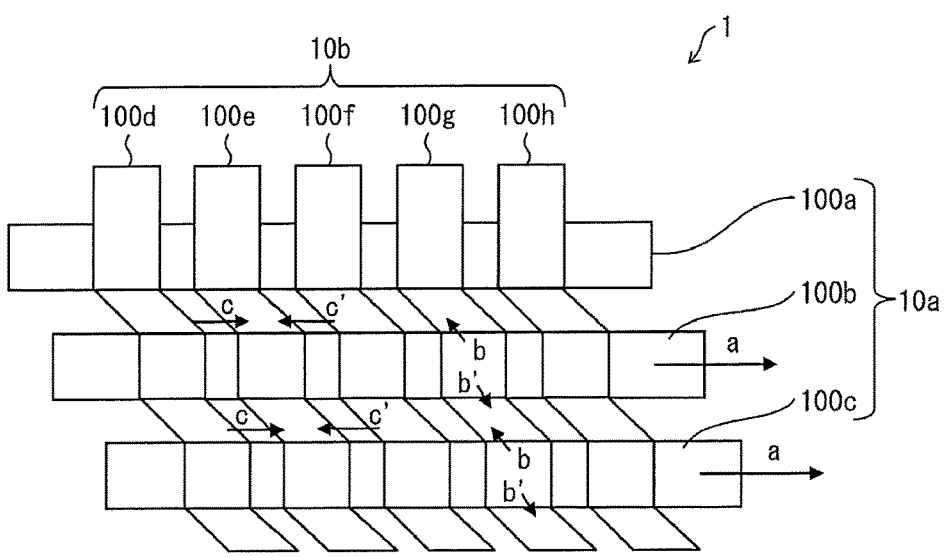
FIG. 2 is a diagram illustrating an effect of a gap in deformation of a prepreg tape.

FIG. 2 is a diagram illustrating an effect of a gap in the deformation of the prepreg tape 100. As illustrated in FIG. 2, for example, in a case where the prepreg tapes 100b and 100c of the unit layer 10a are pulled in a direction of an arrow a and a direction orthogonal to the direction of the arrow a, the unrestrained region of the prepreg tapes 100d to 100h is deformed, and the prepreg sheet 1 is deformed. In this case, the prepreg tape 100 is also deformed along with the deformation of the prepreg sheet 1. Specifically, in the unrestrained region that contributes to the deformation of the prepreg sheet 1, the width contracts in directions of arrows c and c' by a tensile force. On the other hand, in the restrained region of the prepreg tapes 100b and 100c, a tensile force is applied in directions of arrows b and b' (a width direction), and the width extends. As a result of such deformation of the prepreg tape 100, in the unit layer 10b, the width of the gap adjacent to the unrestrained region that contributes to the deformation of the prepreg sheet 1 extends, and in the unit layer 10a, the width of the gap adjacent to the prepreg tapes 100b and 100c contracts.

In the prepreg sheet 1, in the unit layers 10a and 10b, the orientation directions of the prepreg tapes 100 are different from each other, and thus, the unrestrained region is provided in a lateral end portion of the prepreg tape 100. Accordingly, a freedom degree of the deformation of the prepreg tape 100 further increases.

The restrained region retains the shape of the prepreg sheet, and functions as described above, but the viscosity of the matrix resin composition that restrains the prepreg tapes decreases at the time of heating and pressurizing the prepreg sheet, and thus, the prepreg tapes are not completely restrained. For this reason, it is also possible for the prepreg tape to be moved at the time of heating and pressurizing, and in the molded article to be obtained, the fiber meandering as illustrated in FIG. 2 is solved.

A part of the plurality of laminated unit layers configuring the prepreg sheet may not have the gap, within a range in which the effect of this embodiment is obtained.

For example, in the prepreg sheet including the unit layer having the gap and the unit layer not having the gap, a ratio of the unit layer having the gap may be suitably determined within the range in which the effect of this embodiment is obtained. From such a viewpoint, the ratio is preferably greater than or equal to 0.1%, is more preferably greater than or equal to 0.2%, and is even more preferably greater than or equal to 0.5%. For example, in the case of the prepreg sheet in which five unit layers are laminated, the number of unit layers having the gap in the prepreg sheet may be 2 to 5.

Furthermore, in the prepreg sheet, the position of the unit layer having the gap in a lamination direction may be suitably determined within the range in which the effect of this embodiment is obtained, and the unit layer having the gap and the unit layer not having the gap may be alternately arranged, or may be unevenly arranged, in the lamination direction.

(Number of Laminated Unit layers and Thickness of Prepreg Sheet)

In the prepreg sheet according to one aspect of the invention, it is sufficient that the plurality of unit layers are laminated, and the number of laminated unit layers is not limited. The number of laminated unit layers of the prepreg sheet can be suitably set in accordance with a thickness that is required for the prepreg sheet or the molded article to be obtained.

In the prepreg sheet according to one aspect of the invention, the thickness of the sheet is not particularly limited, and it is preferable that the thickness is within a range of 0.03 mm to 6 mm. In a case where the thickness of the sheet is greater than or equal to 0.03 mm, the shape retention properties of a preform are excellent. A lower limit value of the thickness of the sheet is more preferably greater than or equal to 0.2 mm, and is even more preferably greater than or equal to 0.4 mm. In addition, in a case where the thickness of the sheet is less than or equal to 6 mm, the preforming properties of the preform are excellent, and it is possible to reduce the occurrence of the wrinkles on the molded article to be obtained. An upper limit value of the thickness of the sheet is more preferably less than or equal to 5 mm, and is even more preferably less than or equal to 4 mm.

(Orientation Direction of Prepreg Tape)

It is sufficient that the prepreg sheet according to one aspect of the invention is arranged such that the gap having a predetermined width is formed between the plurality of prepreg tapes in the same unit layer. Accordingly, the orientation directions of the plurality of prepreg tapes in the same unit layer may be identical to each other, or may be different from each other. It is preferable that the orientation directions of the prepreg tapes in the same unit layer are substantially identical to each other, and are approximately parallel to each other. According to such a configuration, it is possible to make productivity and physical properties of the prepreg sheet compatible. It is preferable that the orientation direction of the prepreg tape is substantially identical to the orientation direction of the reinforced fiber.

(Width of Prepreg Tape)

In the prepreg sheet according to one aspect of the invention, the width of the prepreg tape is not particularly limited, and it is preferable that the width is within a range of 3 mm to 55 mm. In a case where the width of the prepreg tape is wider than or equal to 3 mm, it is possible to efficiently form the unit layer. A lower limit value of the width of the prepreg tape is more preferably wider than or equal to 5 mm, and is even more preferably wider than or equal to 6 mm. In addition, in a case where the width of the prepreg tape is narrower than or equal to 55 mm, a yield ratio of the prepreg tape is excellent regardless of a planar shape for laying the prepreg tape. An upper limit value of the width of the prepreg tape is more preferably narrower than or equal to 40 mm, and is even more preferably narrower than or equal to 30 mm.

In addition, in the prepreg sheet according to one aspect of the invention, the widths of the prepreg tapes in the same unit layer may be different from each other, or may be identical to each other. In addition, the widths of the prepreg tapes in different unit layers may be different from each other, or may be identical to each other.

Furthermore, it is sufficient that the width of the prepreg tape is a value that represents the dimension of each of the prepreg tapes in the width direction. For example, the width of the prepreg tape may be an average value of the dimensions in the width direction at three arbitrary points including both ends of the prepreg tape in the longitudinal direction, or may be an average value of a maximum value and a minimum value of the dimensions of each of the prepreg tapes in the width direction.

The width of the prepreg tape may include a slight variation within a range in which the gap described above can be ensured. For example, there is a case where a tow prepreg described below includes a variation in the width due to the process thereof. In a case where the variation is excessively large, there is a case where the gap described above is not capable of being ensured, and it is preferable that the variation decreases from the viewpoint of an accuracy, but there is a case where a manufacturing cost of the prepreg tape increases.

The variation in the width of the prepreg depends on the size of the width of the prepreg tape, and for example, in a case where the width is 12.7 mm, the variation is preferably less than or equal to ±0.7 mm, and is more preferably less than or equal to ±0.4 mm. However, the variation in the width of the prepreg tape also depends on the size of the width of the prepreg tape, and thus, is not limited to the example described above. In addition, rarely, there is a case where a carbon fiber bundle includes a twist, and there is a case where the width of the prepreg tape locally decreases in a twist portion, but such a fluctuation in the width is excluded from the variation.

(Width of Gap)

In the prepreg sheet according to one aspect of the invention, the width of the gap is not particularly limited insofar as the width of the gap is narrower than or equal to 10% of the width of the adjacent prepreg tapes whichever is narrower, and the widths of the gaps in the same unit layer may be different from each other, or may be identical to each other.

A lower limit value of the width of the gap is preferably wider than or equal to 0.1% of the width of the adjacent prepreg tapes 100 whichever is narrower, is more preferably wider than or equal to 0.5%, and is even more preferably wider than or equal to 1%. In a case where the lower limit value of the width of the gap is within the range described above, the drape properties of the prepreg sheet is more excellent.

(Number of Prepreg Tapes)

In the prepreg sheet according to one aspect of the invention, the number of prepreg tapes configuring one unit layer is not particularly limited. The number of prepreg tapes can be suitably selected in accordance with the size of a target prepreg sheet and the width of the prepreg tape to be laid.

(Laminated Configuration of Prepreg Sheet)

The prepreg sheet according to one aspect of the invention may include the prepreg tape oriented to the intersecting direction to the direction of a plurality of the prepreg tapes in the unit layer directly above or directly below. It is preferable that the prepreg sheet according to one aspect of the invention is preferable to be formed to include a plural of unit layers with the prepreg tape oriented to the intersecting direction to the direction of a plurality of the prepreg tapes in the unit layer directly above or directly below. Accordingly, a plurality of restrained regions are formed between the prepreg tapes of the unit layer directly above or directly below. The prepreg sheet according to one aspect of the invention may include the unit layer including the prepreg tapes that are oriented in the same direction as the orientation direction of the prepreg tape of the unit layer other than the unit layer directly above or directly below in the plurality of unit layers. In addition, the prepreg tapes of all of the unit layer may be oriented in the direction intersecting with the orientation direction of the prepreg tape of the other unit layers. According to such a laminated configuration, it is possible to make the prepreg sheet self-standing. In addition, the prepreg sheet is easily preformed, and it is difficult for an opening to be generated in the preform to be obtained. Further, when the obtained preform is molded, it is difficult for an opening to be generated in the molded article, and the appearance and the physical properties are excellent.

In the prepreg sheet according to one aspect of the invention, an angle at which the orientation directions of the prepreg tapes intersect with each other (an intersection angle) is not particularly limited. Here, "intersecting" herein indicates a state in which the orientation direction of one prepreg tape crosses the orientation direction of the other prepreg tape at an arbitrary angle that is not parallel. Furthermore, here, the "intersection angle" indicates an angle having a smaller absolute value of the angles at which the orientation directions of two prepreg tapes intersect with each other.

Figure 3:
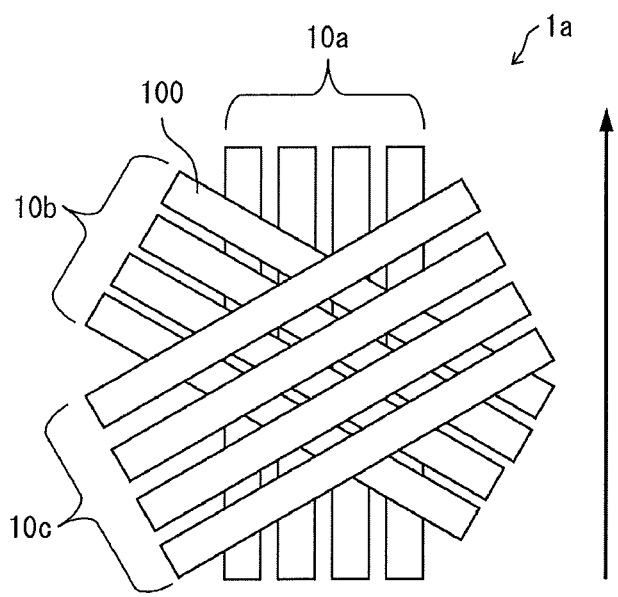
FIG. 3 is a top view illustrating a schematic configuration of a prepreg sheet according to Embodiment 2 of the invention.

FIG. 3 is a top view illustrating a schematic configuration of a prepreg sheet 1*a* according to Embodiment 2 of the invention. The prepreg sheet 1*a* includes three-layer of unit layers 10*a*, 10*b*, and 10*c*. In a case where a direction represented by an arrow in the drawing is set to 0°, the prepreg tapes 100 of the unit layer 10*a* are arranged to be oriented in the direction of 0°. The prepreg tapes 100 of the unit layer 10*b* are arranged such that the intersection angle is −60°. The prepreg tapes 100 of the unit layer 10*c* are arranged such that the intersection angle is 60°. The prepreg tapes 100 of the unit layer 10*b* are respectively oriented with respect to the orientation direction of the prepreg tapes 100 of the unit layer 10*a* such that the intersection angle is −60°. In addition, the prepreg tapes 100 of the unit layer 10*c* are respectively oriented with respect to the orientation direction of the prepreg tapes 100 of the unit layer 10*b* such that the intersection angle is 60°. There is a case where such a laminated configuration is referred to as pseudo-isotropic lamination. The pseudo-isotropic lamination indicates that n layers (n≥3) of anisotropic materials are laminated by being shifted by (360/n°). Furthermore, as with the prepreg sheet 1 of Embodiment 1 described above, the laminated configuration in which the prepreg tapes are oriented such that the intersection angle is a right angle (−90° or 90°), in particular, will be referred to as orthogonal lamination.

(Other Configurations)

The prepreg sheet according to one aspect of the invention may be debulked. A method for debulking the prepreg sheet will be described below.

In addition, the prepreg sheet according to one aspect of the invention may further include a covering material on both surfaces or any one surface. Accordingly, it is possible to efficiently apply design properties to the molded article. The covering material is not particularly limited, and can be suitably selected in accordance with a target fiber-reinforced composite.

(Unit Layer with a Covering Material)

The prepreg sheet according to one aspect of the invention can also be manufactured by peeling off the covering material from a unit layer with a covering material including a single layer of the unit layer, and by allowing the obtained unit layers to laminate each other. The unit layer with a covering material includes the covering material, and the unit layer that is arranged on the covering material. The unit layer has a configuration in which the plurality of arranged prepreg tapes with a gap, and is as described above. The prepreg tape contains the reinforced fiber bundle and the matrix resin composition. The prepreg tape will be described below. The width of the gap in the unit layer with a covering material may be narrower than or equal to 10% of the width of the adjacent prepreg tapes whichever is narrower, and is identical to that of the gap of the unit layer described above.

The covering material is a member that supports the prepreg tape such that the prepreg tape can be peeled off, and it is preferable that the covering material has flexibility, and in this example, the covering material includes a flexible film. The flexible film has flexibility, and can be suitably selected from known resin films within a range having both of adhesiveness and peeling properties with respect to the prepreg tape. A polyethylene terephthalate film, a polypropylene film, a polyimide film, an aramid film, a polyethylene naphthalate film, an aramid film, and the like can be used as the flexible film. It is preferable that the flexible film is a polyethylene film from the viewpoint of flexibility and release properties. In addition, it is preferable that the thickness of the flexible film is 10 μm to 100 μm as a film having durability, from the viewpoint of a less influence of the wrinkles on the sheet, and form retention properties. Furthermore, examples of the covering material other than the flexible film include a release sheet having adhesiveness and release properties with respect to the prepreg sheet (also referred to as a "backing sheet"), and a metal foil such as an aluminum foil.

Hereinafter, the prepreg tape configuring the prepreg sheet according to one aspect of the invention will be described in detail.

(Prepreg Tape)

The prepreg tape described herein may be a tow prepreg that is a tape-like intermediate material in which the matrix resin composition is impregnated in a continuous reinforced fiber bundle, or may be a slit tape obtained by slitting a sheet-like prepreg in which the matrix resin composition is impregnated in a state where the reinforced fiber bundle is unidirectionally aligned into the shape of a strip.

(Tow Prepreg)

The tow prepreg, for example, is a narrow intermediate base material obtained by impregnating the matrix resin composition in the reinforced fiber bundle including thousands to tens of thousands of filaments of a reinforced fiber unidirectionally arranged, and then, by winding the bundle in a bobbin such as a paper tube. The slit tape is manufactured through a step (a slitting step) of slitting the prepreg with a slitter after the prepreg is manufactured, and thus, it costs for introducing the slitter and for the slitting step. On the other hand, the slitting step is not necessary for the tow prepreg, and thus, the tow prepreg can be inexpensively manufactured. For this reason, the tow prepreg is useful as the intermediate base material for manufacturing the fiber-reinforced composite (for example, a product for an automobile) that is required to be manufactured with high productivity.

In addition, a sectional shape of the tow prepreg is not limited, and for example, is an approximately elliptical shape. In general, the slit tape is manufactured by cutting a planar prepreg, and thus, a sectional shape of the slit tape is an approximately rectangular shape. On the other hand, in the tow prepreg, a resin with a low viscosity is impregnated in a tow of a carbon fiber without applying a pressure, and thus, the shape of the tow of the carbon fiber that is unwound is nearly maintained, and such a difference in the sectional shape occurs. The sectional shape is the approximately elliptical shape, and thus, when the prepreg sheet having the gap of the invention is molded, it is possible to ensure a flow path that is larger than that of the slit tape of which the sectional shape is the rectangular shape. For this reason, it is difficult for the fiber meandering to occur. In addition, even in a case where upper and lower layers of the unit layer overlap each other, and a restraint point is generated, a restraint area further decreases. For this reason, the tow is easily moved and deformed, and the preforming properties and the molding properties of the prepreg sheet easily increase. For this reason, it is preferable that the tow prepreg is used as the prepreg tape.

(Reinforced Fiber)

For example, a general reinforced fiber that is used in the fiber-reinforced composite, such as a carbon fiber (furthermore, in the invention, a graphite fiber is also included in the carbon fiber), a glass fiber, an aramid fiber, a high-strength polyester fiber, a boron fiber, an alumina fiber, a silicon nitride fiber, and a nylon fiber, can be used as the reinforced fiber include glass fiber. Among them, the carbon fiber is preferable from the viewpoint of having lightness in weight, a high strength, and a high elastic modulus, and of being excellent in heat resistance and chemical resistance. Examples of the carbon fiber include types such as a pitch-based carbon fiber, a polyacrylonitrile (PAN-based) carbon fiber, and a rayon-based carbon fiber, and any carbon fiber may be used. The PAN-based carbon fiber is more preferable from the viewpoint of the productivity of the carbon fiber. In addition, in order to improve the convergence of the tow of the carbon fiber, or adhesiveness between the carbon fiber and a matrix resin at the time of manufacturing the fiber-reinforced composite, a carbon fiber in which approximately 0.01 mass % to 5 mass % of a substance having one or more types of functional groups selected from an epoxy group, a hydroxyl group, an amino group, a carboxyl group, a carboxylic acid anhydride group, an acrylate group, and a methacrylate group is subjected to an attachment treatment with respect to a surface may be used.

A high-strength carbon fiber having a strand tensile strength of greater than or equal to 4 GPa, preferably greater than or equal to 4.6 GPa, and a tensile elongation of greater than or equal to 1.5% is suitable for exhibiting the strength of the fiber-reinforced composite, as the carbon fiber. Here, the strand tensile strength indicates a strength measured by a strand tensile test that is performed on the basis of JIS R7601(1986).

A filament diameter is preferably within a range of 1 μm to 20 μm, and is more preferably within a range of 3 μm to 10 μm, as the thickness of the reinforced fiber. The thickness of the reinforced fiber is set to be less than or equal to 20 μm, and thus, it is possible to increase a tensile strength or a tensile modulus. In addition, the thickness of the reinforced fiber is set to be greater than or equal to 1 μm, and thus, it is possible to increase the productivity of the reinforced fiber bundle, and to reduce the manufacturing cost.

(Reinforced Fiber Bundle)

The number of filaments of the reinforced fiber bundle that is used in one aspect of the invention is 1000 to 100000, is preferably 1000 to 60000, and is more preferably 3000 to 50000. The number of filaments is set to be greater than or equal to 1000, and thus, it is possible to increase productivity at the time of automatically laminating the filaments as the prepreg tape. The number of filaments is set to be less than or equal to 60000, and thus, it is possible to easily impregnate the matrix resin composition in the reinforced fiber bundle.

In addition, it is preferable that a reinforced fiber yarn that is used in the invention is a twistless reinforced fiber yarn from the viewpoint of a tendency that concavities and convexities of the surface of the prepreg sheet are reduced, of increasing the evenness of the gap, and of easily filling the gap after the molding. In a case where there is a twist, the number of twists is preferably less than or equal to 5 times/m, is more preferably less than or equal to 2 times/m.

(Matrix Resin Composition)

The matrix resin composition contains the matrix resin. A thermoplastic resin and/or a thermosetting resin can be used as the matrix resin.

The thermoplastic resin is in a liquid state having a high viscosity by heating, and can be freely deformed by an external force, and in a case where the external force is removed by cooling, the thermoplastic resin is in a solid state, and keeps the shape thereof. In addition, such a procedure is repeatedly performed. The thermoplastic resin is not particularly limited, and can be suitably selected within a range in which mechanical properties as the molded article do not greatly decrease. For example, a polyolefin-based resin such as a polyethylene resin and a polypropylene resin, a polyamide-based resin such as a nylon 6 resin and a nylon 6,6 resin, a polyester-based resin such as a polyethylene terephthalate resin and a polybutylene terephthalate resin, a polyphenylene sulfide resin, a polyether ketone resin, a polyether sulfone resin, an aromatic polyamide resin, and the like can be used as the thermoplastic resin. Among them, any one of the polyamide resin, the polypropylene resin, and the polyphenylene sulfide resin is preferable from the viewpoint of the physical properties or the price.

The thermosetting resin is a reactive polymer in which a curing reaction of intermolecular cross-linkage progresses due to the action of heat or a catalyst, and an insoluble and infusible three-dimensional mesh structure is obtained. The thermosetting matrix resin is not also particularly limited, and can be suitably selected within the range in which the mechanical properties as the molded article do not greatly decrease. Examples of the thermosetting matrix resin include an epoxy resin, an unsaturated polyester resin, an acrylic resin, a vinyl ester resin, a phenolic resin, a phenoxy resin, an alkyd resin, an urethane resin, a maleimide resin, a cyanate resin, a benzoxazine resin, an epoxy acrylate resin, an urethane acrylate resin, and the like. One or more types of such resins can be suitably selected and used as the thermosetting matrix resin, and among them, the epoxy resin is preferable from the viewpoint of a tendency that it is possible to increase a strength after the curing.

Thermal properties and the type of the matrix resin composition can be suitably selected in accordance with the application of the fiber-reinforced composite. For example, in the fiber-reinforced composite of the product for an automobile, high productivity is required, and thus, fast curing properties and heat resistance are required.

In order to ensure sufficient productivity in the manufacturing of the product for an automobile, the fast curing properties for shortening a curing time of the thermosetting matrix resin composition, and the heat resistance for improving workability for taking out a molded product from a mold without distortion are required. A glass transition temperature (Tg) of the thermosetting matrix resin composition after the curing may be a degree in which a sufficient rigidity necessary at a molding temperature is obtained, and is preferably higher than or equal to 100° C., and is more preferably higher than or equal to 120° C. It is preferable that Tg described above is high from the above viewpoint, and an upper limit value thereof is not specified from the above viewpoint, and is preferably lower than or equal to a heat decomposition temperature of the thermosetting matrix resin. In a case where the epoxy resin is used, the heat decomposition temperature is approximately 300° C., and thus, it is preferable that Tg described above is lower than or equal to 300° C. There is tendency that the molding temperature becomes higher, and a molding time becomes longer, as Tg described above increases, but Tg described above is lower than or equal to 300° C., and thus, it is possible to perform the curing (high cycle molding) for a short period of time.

In addition, examples of the type of thermosetting matrix resin in the application of the product for an automobile include an epoxy resin, a phenolic resin, a cyanate resin, an isocyanate resin, an unsaturated imide resin, an amino resin, an unsaturated polyester resin, an allyl resin, a dicyclopentadiene resin, a silicone resin, a melamine resin, and the like. Among them, the epoxy resin is preferable from the viewpoint of exhibiting sufficient fast hardening properties and a sufficient mechanical strength described above.

For example, in a case where the thermosetting matrix resin is the epoxy resin, an amine compound, an urea compound, or an imidazole compound is preferable, and a combination thereof in which the resins described above are compounded at an arbitrary amount, as a curing agent of the thermosetting matrix resin from the viewpoint of exhibiting the fast curing properties. The added amount of the curing agent described above is preferably 1 part by mass to 15 parts by mass, and is more preferably 2 parts by mass to 10 parts by mass, with respect to 100 parts by mass of an epoxy resin in a composition containing the epoxy resin and the curing agent described above, from the viewpoint of reactivity and storage stability.

The viscosity of the thermosetting matrix resin composition at 30° C. may be 10000 Pa·s to 100000 Pa·s, and the viscosity is preferably 10000 Pa·s to 50000 Pa·s, and is more preferably 14000 Pa·s to 35000 Pa·s. It is preferable that the viscosity described above is set to be greater than or equal to the lower limit from the viewpoint of obtaining the tow prepreg having an appropriate hardness. It is preferable that the viscosity described above is set to be less than or equal to the upper limit from the viewpoint of smoothly winding the tow prepreg in the bobbin. Furthermore, the "viscosity" indicates a value that is measured by temperature rising viscosity measurement. The temperature rising viscosity measurement was performed in a condition of a plate gap of 0.5 mm, a measurement frequency of 10 rad/sec, a temperature rising rate of 2.0° C./min, and a stress of 300 Pa, by using a parallel plate having a diameter of 25 mm in AR-G2 (manufactured by TA Instruments Inc.).

The viscosity of the thermosetting matrix resin composition can be suitably determined in accordance with the type of prepreg tape. For example, in the tow prepreg, the viscosity of the thermosetting matrix resin composition is preferably less than or equal to 100 Pa·s at 70° C., and is more preferably less than or equal to 10 Pa·s, from the viewpoint of allowing the thermosetting matrix resin composition to rapidly and sufficiently infiltrate into the reinforced fiber at the time of manufacturing the tow prepreg. On the other hand, the viscosity of the thermosetting matrix resin composition that is used in tow prepreg is preferably greater than or equal to 0.1 Pa·s at 70° C., and is more preferably greater than or equal to 1 Pa·s at 70° C., from the viewpoint of handling properties at the time of sheet processing while having excellent infiltration properties described above, and from the viewpoint of exhibiting a sufficient mechanical strength after thermal curing.

In addition, in the temperature rising viscosity measurement in which the thermosetting matrix resin composition that is used in one aspect of the invention is subjected to temperature rising at 2.0° C./minute, the lowermost viscosity is preferably 0.3 Pa·s to 20 Pa·s, and is more preferably 0.5 Pa·s to 20 Pa·s. It is preferable that the lowermost viscosity described above is set to be greater than or equal to the lower limit from the viewpoint of suppressing a resin flow rate at the time of press molding, and of preventing the surface of the fiber-reinforced composite to be obtained from having an appearance defect such as the occurrence of concavities and convexities. It is preferable that the lowermost viscosity described above is set to be less than or equal to the upper limit from the viewpoint of reducing a defect of a cured matter by generating a resin flow at the time of press molding, and by eliminating air bubbles that are included in the sheet layer and between the layers.

It is preferable that a temperature range in which the lowermost viscosity is exhibited is 100° C. to 120° C. It is preferable that the temperature range in which the lowermost viscosity is exhibited is higher than or equal to 100° C. from the viewpoint of preventing the resin from being pervaded a molded body due to an excessively decrease in the flow rate at the time of press molding. In addition, it is preferable that the temperature range in which the lowermost viscosity is exhibited is lower than or equal to 120° C. from the viewpoint of suppressing the flow rate at the time of press molding.

(Resin Content of Prepreg Tape)

A resin content of the prepreg tape is preferably 20 mass % to 45 mass %, and is more preferably 25 mass % to 40 mass %. It is preferable that the resin content described above is greater than or equal to 20 mass % from the viewpoint of reducing voids in the fiber-reinforced composite to be obtained. In addition, it is preferable that the resin content described above is less than or equal to 45 mass % from the viewpoint of increasing the mechanical properties of the fiber-reinforced composite to be obtained, and of preventing the tack of the prepreg tape from excessively increasing.

In addition, in the thermosetting matrix resin, various additives such as a curing agent, a mold release agent, a defoaming agent, an ultraviolet absorber, and a filler, and the like may be contained.

(Method for Manufacturing Tow Prepreg)

The tow prepreg can be prepared by impregnating the matrix resin composition in the reinforced fiber bundle. Examples of a feeding method of the thermosetting matrix resin composition with respect to the reinforced fiber bundle include a "resin bath method" in which the reinforced fiber bundle (the tow) is impregnated in the thermosetting matrix resin composition through a resin bath, and then, a redundant thermosetting matrix resin composition is squeezed by an orifice, a roll, or the like, and thus, a resin content is adjusted; a "rotating roll method" that is a transfer roll type impregnation method (for example, an impregnation method of a rotating drum including a doctor blade) in which a thermosetting matrix resin composition layer is formed on a rotating roll, and is transferred to the tow; an "on-sheet transfer method" in which the thermosetting matrix resin composition layer is formed on a sheet, and is transferred to the tow; a "nozzle dripping method" described in JP 09-176346 A, JP 2005-335296 A, and JP 2006-063173 A, and the like. Among them, the rotating roll method is preferable from the viewpoint of controlling a feed rate of the thermosetting matrix resin composition and the ease of implementation. It is preferable that the thermosetting matrix resin composition is homogeneously impregnated in the reinforced fiber bundle.

(Slit Tape)

The slit tape is a narrow intermediate base material that is obtained by slitting a general unidirectional prepreg into the shape of a strip with a slitter, and by winding the slit prepreg in a bobbin such as a paper tube.

Furthermore, a difference between the tow prepreg and the slit tape is that the former is manufactured by impregnating the matrix resin composition in a reinforced fiber bundle unit, and by performing winding with a constant width, but the latter is manufactured by preparing a sheet-like unidirectional prepreg in which the matrix resin composition is impregnated in a state where the reinforced fiber bundle is unidirectionally aligned, and by performing slitting with a predetermined width. Therefore, only the matters relevant to such a difference will be described below. The description with respect to the tow prepreg described above can also be applied to the slit tape except for the following description, and thus, the description thereof will not be repeated.

(Method for Manufacturing Slit Tape)

The slit tape can be prepared by slitting the sheet-like unidirectional prepreg in which the matrix resin composition is impregnated in a state where the reinforced fiber bundle is unidirectionally aligned, into the shape of a strip with a dedicated slitter. Examples of a method for manufacturing the unidirectional prepreg include a hot melt method in which a film of the matrix resin composition is pasted to the carbon fiber bundle that is unidirectionally aligned, and then, is impregnated by being heated, and the like.

(Application of Prepreg Sheet)

As described above, the prepreg sheet according to one aspect of the invention is excellent in the following properties with respect to the shape of the mold. Accordingly, the prepreg sheet is suitable as the fiber-reinforced composite that is used for manufacturing a molded article having a complicated shape (for example, an automobile component or the like).

[2. Method for Manufacturing Prepreg Sheet]

A method for manufacturing the prepreg sheet according to one aspect of the invention is a method for manufacturing the prepreg sheet in which the plurality of unit layers of the prepreg tapes are laminated, by repeating a unit layer forming step of forming the unit layer including the plurality of prepreg arranged tapes arranged in which the matrix resin composition is impregnated in the reinforced fiber bundle.

(Unit layer Forming Step)

In the unit layer forming step, the prepreg tapes are arranged to have a gap between the adjacent prepreg tapes. The width of the gap is as described above in the section of "1. Prepreg Sheet".

The prepreg tapes are laid planarly to have a gap of a predetermined width between the adjacent prepreg tapes, one unit layer is formed, and the unit layer forming step is repeated with respect to the unit layer a plurality of times, and thus, it is possible to manufacture the prepreg sheet in which the plurality of unit layers of the prepreg tapes are laminated.

In the method for manufacturing the prepreg sheet according to one aspect of the invention, in at least one time of the unit layer forming step of the plurality of times of the unit layer forming step, the prepreg tapes are arranged to be oriented in the direction intersecting with the orientation direction of the prepreg tapes of the other unit layer. Accordingly, it is possible to manufacture the prepreg sheet including at least one unit layer including the prepreg tapes that are oriented in the direction intersecting with the orientation direction of the prepreg tapes of the other unit layer.

It is preferable that the unit layer forming step is performed while heating the prepreg tape. By performing the heating, it is possible to laminate the prepreg tapes with adhesiveness. Accordingly, it is possible to prevent the prepreg tape from being peeled off in the prepreg sheet.

The unit layer forming step may be performed manually, and can also be performed by using an automatic laminating device (automated fiber placement (AFP)). Accordingly, it is possible to automatically laminate the prepreg tapes, and thus, it is possible to efficiently manufacture the prepreg sheet.

A known device can be used as the automatic laminating device for automatically laminating the prepreg tapes. In addition, it is also possible to manually laminating the prepreg tapes by using a known drum winding device. It is preferable that the automatic laminating device and the drum winding device have a function of heating a laminated portion such that peeling after lamination does not occur.

The unit layer forming step may be performed on the covering material described above in the section of the unit layer with a covering material. Accordingly, it is possible to manufacture the prepreg sheet further including the covering material on both surfaces or any one surface.

(Debulking Step)

The method for manufacturing the prepreg sheet according to one aspect of the invention may include a step of debulking the prepreg sheet that is manufactured by the unit layer forming step. The prepreg sheet is debulked, and thus, it is possible to retain the arrangement of the prepreg tape in the prepreg sheet in a suitable position.

A method in which there is no heating of a material, and the reinforced fiber of the prepreg sheet does not meander is preferable as a method for debulking the prepreg sheet. For example, examples of the method include a method in which the prepreg sheet is arranged on a flat tool, and a rubber film or the like is arranged thereon, and then, the rubber film is crimped by vacuuming the inside, and thus, is debulked, and the like.

The prepreg sheet that is manufactured by the method for manufacturing the prepreg sheet according to one aspect of the invention is also included in the scope of the invention.

[3. Method for Manufacturing Fiber-Reinforced Composite]

A method for manufacturing the fiber-reinforced composite according to one aspect of the invention is a method for manufacturing the fiber-reinforced composite of molding a laminate of the plurality of prepreg sheets according to one aspect of the invention (hereinafter, also referred to as a "prepreg laminated sheet"), and of manufacturing the fiber-reinforced composite, and includes a preforming step of preparing the perform by preforming one prepreg sheet or one prepreg laminated sheet into a shape closer to the shape of the molded article than the shape of the prepreg sheet, and a molding step to heat, pressurize and cure the preform by heating and pressurizing in the mold of which the temperature is adjusted to be higher than or equal to a curing temperature of the thermosetting matrix resin composition.

The method for manufacturing the fiber-reinforced composite according to one aspect of the invention includes the preforming step and the molding step, and thus, it is possible to obtain the molded article having a desired stereoscopic shape. In addition, the prepreg sheet according to one aspect of the invention is preformed and molded, and thus, it is possible to suppress the occurrence of the wrinkles and the reinforced fiber meandering at the time of molding. Accordingly, the method for manufacturing the fiber-reinforced composite according to one aspect of the invention is capable of manufacturing the fiber-reinforced composite that has a desired stereoscopic shape and excellent appearance.

(Preforming Step)

In the preforming step, one prepreg sheet or one prepreg laminated sheet is preformed into the shape closer to the shape of the molded article than the shape of the prepreg sheet, and thus, the preform is produced. Accordingly, one prepreg sheet or one prepreg laminated sheet can be preformed into the shape closer to a stereoscopic shape of the molded article than a stereoscopic shape of the prepreg sheet. In the preforming step, it is preferable that the preform having an approximately net shape (the stereoscopic shape) of a desired shape of the molded article is produced, and it is more preferable that the preform having the net shape (the stereoscopic shape) of a desired shape of the molded article is produced. The prepreg sheet is preformed before the molding step of obtaining the target fiber-reinforced composite, and thus, it is possible to produce the molded article having a desired shape.

In the preforming step, in a case where the preform is produced from one the prepreg sheet according to one aspect of the invention, the preform is easily formed compared to a case where the preform is produced from the prepreg laminated sheet.

In the preforming step, in a case where the preform is produced from the prepreg laminated sheet, two or more prepreg sheets can be formed into the preform at a time, and thus, an operation efficiency is high.

Examples of a preforming method of the prepreg sheet in the preforming step are capable of including (i) a method of producing the preform by manually pasting the prepreg sheet described above to the mold, and by preforming the prepreg sheet, (ii) a method of debulking the prepreg sheet by arranging the prepreg sheet on the mold, by arranging the rubber film or the like thereon, and then, by crimping the rubber film by vacuuming the inside, (iii) a method of producing the preform by arranging male and female molds in a simple molding machine, by arranging the prepreg sheet an open space between the male and female molds, and by performing preforming by cramping the male and female molds, and the like. It is also possible to perform the preforming by suitably combining the methods of (i) to (iii) described above. The method of (iii) described above is preferable since the preforming can be performed for a short period of time even in a large shape. Here, the male and female molds indicate a pair of molds in which a convex portion or a concave portion of one mold corresponds to a concave portion or a convex portion of the other mold.

The number of prepreg sheets used in the preforming step can be suitably selected in accordance with a thickness required for the molded article. For example, in a case where the thickness required for the molded article is a thickness in which five or more prepreg sheets laminated each other, it is preferable that a step of performing by allowing one prepreg sheet or two or four prepreg sheets to laminate each other a plurality of times. In one time of the preforming step, the number of prepreg sheets to be preformed is set to be 1 or 2 to 4, and thus, it is possible to more preferably preform the prepreg sheet. In the case of obtaining a plurality of preforms, the obtained preforms may be molded by laminating each other.

In addition, in the preforming step, in a case where two or more prepreg sheets laminate each other, the first prepreg sheet and the second prepreg sheet may laminate each other, and be preformed such that all of the orientation directions of the prepreg tapes of the first prepreg sheet are not the same as all of the orientation directions of the prepreg tapes of the second prepreg sheet directly below. Specifically, for example, in a case where two prepreg sheets 1 of Embodiment 1 in which the intersection angle of the prepreg tapes (an angle with respect to a predetermined direction, in the orientation direction of each of the intersecting prepreg tapes) is 0°/90° laminate each other, the prepreg sheets 1 of Embodiment 1 in which the intersection angle of the prepreg tapes is 0°/90° laminate each other by rotating the orientation direction of the prepreg tape of the prepreg sheet by 45° such that all of the orientation directions of the prepreg tapes of the first prepreg sheet are not the same as all of the orientation directions of the prepreg tapes of the second prepreg sheet directly below, and thus, it is possible to perform pseudo-isotropic lamination such as 0°/90°/45°/45°. Accordingly, it is possible to set design such that the molded article has high isotropy or a high strength in an arbitrary direction.

(Molding Step)

In the molding step, the preform is heated and pressurized in the mold of which the temperature is adjusted to be higher than or equal to the curing temperature of the thermosetting matrix resin composition or higher than or equal to a softening temperature of the thermoplastic matrix resin composition (subjected to the press molding). By this operation, the thermosetting matrix resin composition is cured. The thermoplastic matrix resin composition retains the form by being cooled after the press molding. Accordingly, it is possible to obtain the fiber-reinforced composite having a desired stereoscopic shape.

In the molding step, it is preferable that the plurality of preforms laminate each other, and are heated, pressurized, and cured in the mold. For example, in a case where the thickness required for the molded article is a thickness in which five or more prepreg sheets laminate each other, it is preferable that a plurality of preforms formed by preforming one prepreg sheet or a plurality of preforms formed by preforming two to four prepreg sheets are used by laminating each other. Accordingly, it is possible to obtain the fiber-reinforced composite having a desired thickness and a stereoscopic shape.

In a case where the plurality of preforms are used by laminating each other, it is preferable that a first preform and a second preform are used by laminating each other such that all of the orientation directions of the prepreg tapes of the first preform are not the same as all of the orientation directions of the prepreg tapes of the second preform directly below. Accordingly, it is possible to design such that the molded article has high isotropy or a high strength in an arbitrary direction.

In the molding step, it is preferable that the temperature of the mold is adjusted in advance. Accordingly, it is possible to shorten a molding cycle while avoiding an increase and a decrease in the temperature of the mold. As a result thereof, it is possible to efficiently obtain the molded article.

The mold that is used in the molding step is not particularly limited, and it is sufficient that the preform can be cured in the mold under a high temperature and a high pressure. It is preferable that a clearance (a gap) according to the thickness of the preform is set in the mold. In addition, a vacuuming mechanism, an ejector mechanism, or the like can be adopted in the mold, as necessary. Accordingly, it is possible to keep the inside of the mold at the time of closing the mold airtight. Here, the airtight indicates that the thermosetting matrix resin contained in the mold material is not substantially leaked from the mold when a sufficient amount of the mold material for filling the mold is put into the mold, and is pressurized.

Examples of the mold of which the inside is kept airtight include a mold in which a shear edge structure or a rubber seal structure is adopted in a portion in contact with an upper mold and a lower mold (the male mold and the female mold) at the time of tightening the mold. In addition, a mold in which any known structure is adopted may be used insofar as the inside of the mold is kept airtight.

The method for manufacturing the fiber-reinforced composite according to one aspect of the invention may further include the following steps, as necessary.

(Debulking Step)

In a case where the prepreg sheet that is not debulked is used for manufacturing the fiber-reinforced composite, it is preferable that a debunking step of debulking the prepreg sheet is performed before the preforming step. The debulking step is as described above in the section of "2. Method for Manufacturing Prepreg Sheet".

(Preheating Step)

A preheating step is a step of preheating the prepreg sheet before the preforming step. Accordingly, the viscosity of the matrix resin appropriately decreases, and thus, a preforming operation of the preforming step on the subsequent stage is easily performed. As a result thereof, in the preforming step on the subsequent stage, it is possible to excellently produce the preform.

The preheating step is performed at a temperature at which the thermosetting matrix resin used in the prepreg sheet is not cured. For example, it is preferable that the preheating is performed such that the temperature of the prepreg sheet is 40° C. to 80° C. A preheating temperature is set to be higher than or equal to 40° C., and thus, for example, in a case where an epoxy resin is used as the thermosetting matrix resin, there is a tendency that sufficient molding properties can be applied to the matrix resin. In addition, the preheating temperature is set to be lower than or equal to 80° C., and thus, there is a tendency that it is possible to appropriately maintain viscous properties of the matrix resin, and it is possible to finally obtain the fiber-reinforced composite that is excellent in the mechanical properties without occurring fiber disorder of the preform, in the preforming step on the subsequent stage.

Examples of a preheating method are capable of including a method of applying hot air to the prepreg sheet, a method of irradiating the prepreg sheet with an infrared ray, a method of arranging the prepreg sheet on a plate that is heated, and the like. It is preferable that the preheating is performed by irradiating the prepreg sheet with an infrared ray since it is possible to preheat the prepreg sheet for a short period of time, and it is easy to handle the prepreg sheet after the preheating.

(Cutting Step)

A cutting step of cutting the prepreg sheet or the preform into a desired shape may be performed before the preforming step or before the molding step. The cutting step is performed, and thus, it is possible to set the shape of the preform (in particular, the dimension of the preform) to the net shape (the dimension) of a desired shape of the molded article.

As the cutting step for producing the perform having the net shape (the dimension) of the molded article, for example, the prepreg sheet may be cut into a planar development shape of a desired shape of the molded article, and the prepreg sheet may be preformed, and thus, the preform having the net shape (the dimension) of the molded article may be produced. Alternatively, the prepreg sheet is preformed, and thus, the preform having the approximately net shape (dimension) of the molded article may be produced, and then, and a redundant portion of the preform may be cut, and thus, the preform having the net shape (the dimension) of the molded article may be produced. It is preferable that the cutting step is performed after the preforming step and before the molding step, and the preform having the approximately net shape (dimension) of the molded article shape is cut, and thus, the preform having the net shape (the dimension) of the molded article is produced, since a dimension accuracy of the preform to be obtained increases.

Hereinafter, the method for manufacturing the fiber-reinforced composite according to one embodiment of the invention will be described. In this embodiment, two prepreg sheets 1 of Embodiment 1 are used by laminating each other. The prepreg sheet 1 includes two unit layers, and the unit layers are laminated such that the orientation directions of the prepreg tapes of each of the unit layers are orthogonal to each other at 0°/90°.

(Debulking Step)

Figure 4:
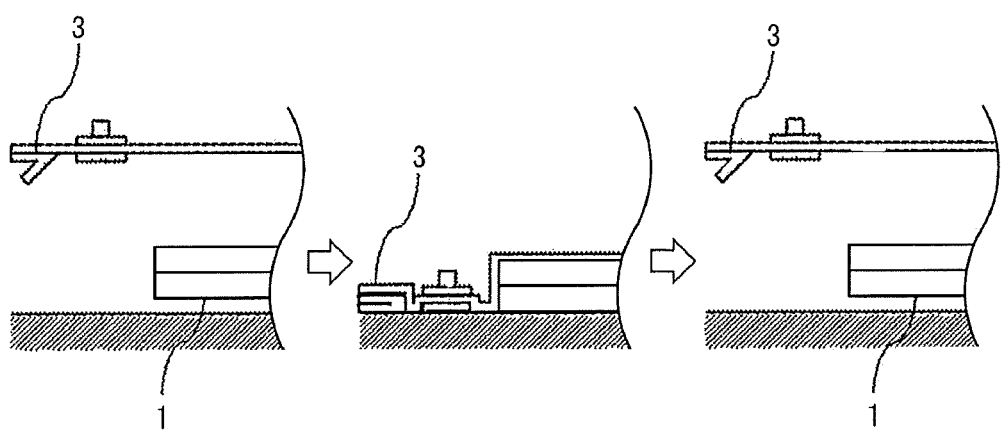
FIG. 4 is a diagram illustrating a debulking step in a method for manufacturing a fiber-reinforced composite according to Embodiment 3 of the invention.

First, the prepreg sheet 1 is debulked. As illustrated in FIG. 4, the prepreg sheet 1 is transported onto a flat working station, the prepreg sheet 1 is covered with a debulk device 3 (for example, a T-7 seal system manufactured by TORR SCIENCE CO., Ltd.), and the inside is in a reduced-pressure state by a vacuum pump, and thus, the prepreg sheet 1 is debulked. In the reduced-pressure state, a state where a vacuum pressure is 700 mmHg is maintained for 5 minutes. After that, the inside is returned to an atmospheric pressure, and thus, the prepreg sheet 1 that is debulked is obtained.

(Preforming Step)

Figure 5:
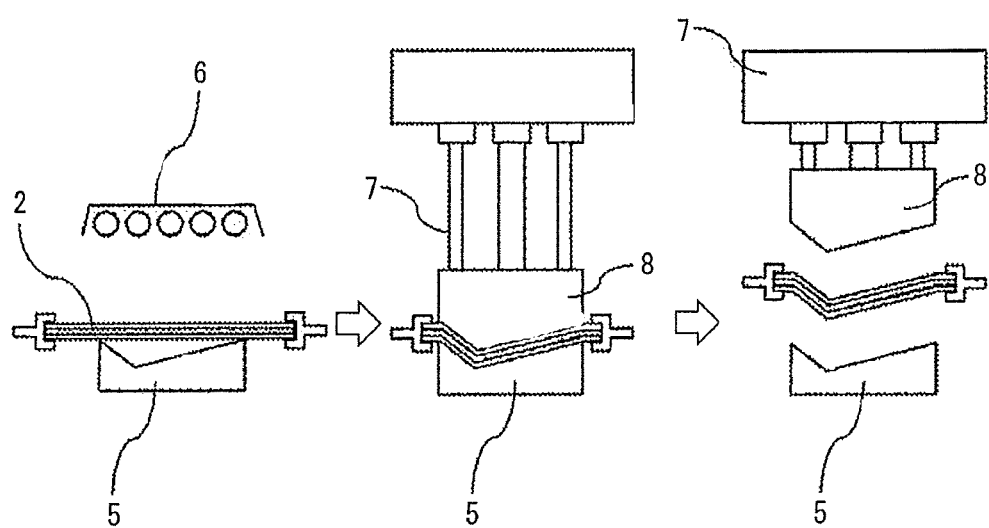
FIG. 5 is a diagram illustrating a preforming step in the method for manufacturing a fiber-reinforced composite according to Embodiment 3 of the invention.

Next, two prepreg sheets 1 that are debulked laminate each other by rotating the orientation direction of the prepreg tape of the prepreg sheet 1 by 45°, and thus, a laminate 2 in which pseudo-isotropic lamination is performed at 0°/90°/45°/−45° is placed on an opening portion of a female mold 5 having a cavity that is opened on an upper surface illustrated in FIG. 5, and the laminate 2 is heated to 70° C. by a movable infrared ray heater 6, and then, a male mold 8 attached to a simple molding machine 7 is lowered, and the laminate 2 is preformed by being interposed between the female mold 5 and the male mold 8, and thus, a preform 9 having the approximately net shape (stereoscopic shape) of the molded article is produced. Then, the female mold 5 and the male mold 8 are cooled by blowing air to the female mold 5 and the male mold 8, and then, the male mold 8 is lifted, and the preform 9 having a shape close to the shape of the molded article is taken out from the cavity of the female mold 5.

(Cutting Step)

Figure 6:
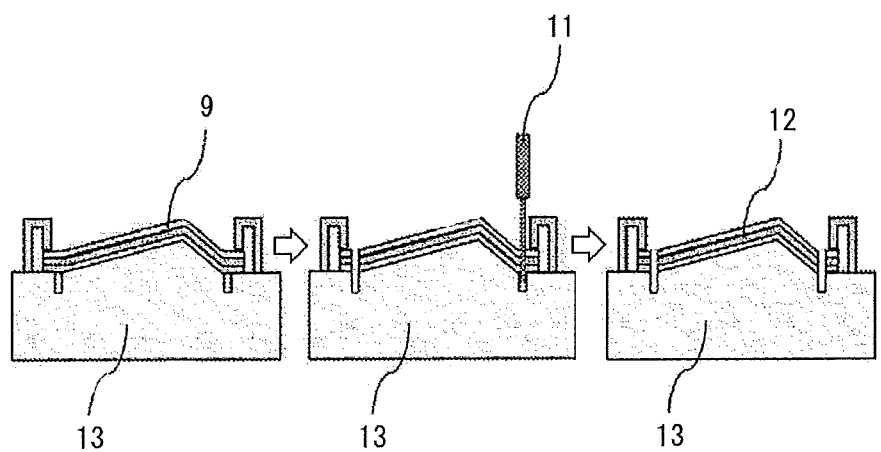
FIG. 6 is a diagram illustrating a trimming step in the method for manufacturing a fiber-reinforced composite according to Embodiment 3 of the invention.

Next, the preform 9 is placed on a trimming jig 13 illustrated in FIG. 6, the outer circumference of the preform 9 is fixed, and the preform 9 is cut along a groove of the trimming jig 13 by an ultrasonic cutter 11, and thus, a preform 12 having the net shape (the dimension) of the molded article is produced.

(Molding Step)

Next, the preform 12 is arranged in the lower mold of the mold of which the temperature is adjusted in advance to 140° C., is interposed between the lower mold and the upper mold of the mold of which the temperature is adjusted to 140° C., is pressurized with a sufficient pressure, and is heated by the mold of which the temperature is adjusted as described above, and thus, the preform 12 is cured. Accordingly, the molded article having a desired shape is obtained. The molding time is preferably 1 minute to 15 minutes, is more preferably 2 minutes to 5 minutes. A surface pressure of the mold at the time of molding is preferably 1 MPa to 15 MPa, and is more preferably 4 MPa to 10 MPa. The molding time can be suitably determined on the basis of productivity required for the molded article and the selection of a material for realizing the productivity. For example, the thermosetting matrix resin for the product for an automobile described above is suitably selected, and thus, it is possible to obtain the molded article by performing the heating and the pressurizing described above for 150 seconds to 600 seconds.

(Method for Manufacturing Fiber-Reinforced Composite Using Unit layer with a Covering Material)

It is possible to manufacture the fiber-reinforced composite according to one aspect of the invention by using the unit layer of the unit layer with a covering material as one prepreg sheet in the preforming step described above. A method for manufacturing the fiber-reinforced composite using the unit layer with a covering material can be performed as with the method for manufacturing the fiber-reinforced composite, except that a step of peeling off the covering material from the unit layer with a covering material, and of taking out the unit layer is further provided.

The fiber-reinforced composite that is manufactured by the method for manufacturing the fiber-reinforced composite according to the embodiment of the invention is also included in the scope of the invention.

[4. Fiber-Reinforced Composite]

The fiber-reinforced composite according to one aspect of the invention is manufactured by curing the prepreg sheet according to one aspect of the invention. For example, the fiber-reinforced composite according to one aspect of the invention can be manufactured by the method for manufacturing the fiber-reinforced composite according to one aspect of the invention.

The fiber-reinforced composite according to one aspect of the invention is manufactured by curing the prepreg sheet according to one aspect of the invention, and thus, the occurrence of the wrinkles and the reinforced fiber meandering at the time of molding is suppressed. Accordingly, the fiber-reinforced composite according to one aspect of the invention has excellent appearance.

CONCLUSION

[1] A prepreg sheet formed by laminating a plurality of unit layers including a plurality of arranged prepreg tapes in which a matrix resin composition is impregnated in a reinforced fiber bundle, in which at least one unit layer has a gap between the adjacent prepreg tapes, and a width of the gap is narrower than or equal to 10% of the width of adjacent prepreg tapes whichever is narrower.

[2] The prepreg sheet according to [1], in which the width of the gap is wider than or equal to 0.1% of the width of adjacent prepreg tapes whichever is narrower

[3] The prepreg sheet according to [1] or [2], in which at least one unit layer includes the prepreg tape oriented in a direction intersecting with an orientation direction of at least one prepreg tape included in the unit layer directly above or directly below.

[4] The prepreg sheet according to any one of [1] to [3], in which the prepreg tapes of each of the unit layers include a region that does not overlap the prepreg tape of the unit layer directly above or directly below, in a lateral end portion.

[5] The prepreg sheet according to any one of [1] to [4], in which the prepreg tapes in the unit layer are arranged in parallel.

[6] A unit layer with a covering material, including: a covering material; and a unit layer that is arranged on the covering material, in which in the unit layer, a plurality of arranged prepreg tapes with a gap, the prepreg tape contains a reinforced fiber bundle and a matrix resin composition, and a width of the gap is narrower than or equal to 10% of the width of the adjacent prepreg tapes whichever is narrower.

[7] A method for manufacturing a prepreg sheet by repeating a unit layer forming step of forming a unit layer by arranging a plurality of prepreg tapes in which a matrix resin composition is impregnated in a reinforced fiber bundle, in which in the unit layer forming step, the prepreg tape is arranged to have a gap between the adjacent prepreg tapes, a width of the gap is a narrower than or equal to 10% of the width of the adjacent prepreg tapes whichever is narrower, and in the unit layer forming step of a plurality of times, the prepreg tape is oriented in a direction intersecting with an orientation direction of the prepreg tape of the other unit layer, at least one time.

[8] A method for manufacturing a fiber-reinforced composite by molding a prepreg sheet or a laminate of a plurality of prepreg sheets according to any one of [1] to [5], comprising: a preforming step of preforming one prepreg sheet or a laminate of two or more prepreg sheets into a shape closer to a shape of the molded article than a shape of the prepreg sheet to prepare a preform; and a molding step of heating pressurizing and curing the preform in a mold heated to a temperature higher than or equal to a curing temperature of the matrix resin composition.

[9] The method for manufacturing a fiber-reinforced composite according to [8], in which in the preforming step, two to four prepreg sheets are laminated to be preformed.

[10] The method for manufacturing a fiber-reinforced composite according to [8] or [9], in which in the molding step, a plurality of preforms are cured by heating and pressurizing in the mold.

[11] The method for manufacturing a fiber-reinforced composite according to any one of [8] to [10], in which in the preforming step, in a case where two or more prepreg sheets are laminated each other, a first prepreg sheet and a second prepreg sheet are laminated each other to be preformed such that all the orientation directions of the prepreg tapes of the first prepreg sheet are different from all the orientation directions of the prepreg tapes of the second prepreg sheet directly below.

[12] The method for manufacturing a fiber-reinforced composite according to any one of [8] to [11], further including: a debulking step of the prepreg sheet before the preforming step.

[13] A fiber-reinforced composite in which the prepreg sheet according to any one of [1] to [5] is cured.

[14] A method for manufacturing a fiber-reinforced composite, comprising: a taking-out step of peeling off the covering material from the unit layer with a covering material according to claim 6, and of taking out the unit layer; a preforming step of preforming one prepreg sheet or a laminate of two or more prepreg sheets into a shape closer to a shape of the molded article than a shape of the prepreg sheet, and of preparing a preform; and a molding step of curing the preform by heating and pressurizing in a mold heated to a temperature to be higher than or equal to a curing temperature of the matrix resin.

[15] A fiber-reinforced composite obtained by the method for manufacturing a fiber-reinforced composite according to [8] or [14].

The invention is not limited to each embodiment described above, and can be variously changed within the scope of the claims, and embodiments obtained by suitably combining the technical means disclosed in each of different embodiments are also included in the technical scope of the invention.

EXAMPLES

Hereinafter, the invention will be described in detail by examples, but the invention is not limited to the examples. Unless otherwise noted, all compounding ratios of materials (raw materials) are represented by parts by mass. In these examples and comparative examples, a floor pan of an automobile was molded from the prepreg sheet.

<Evaluation of Properties of Thermosetting Resin Composition>

(Viscosity Measurement)

Temperature rising viscosity measurement was performed with respect to each thermosetting resin composition prepared in each of the examples and the comparative examples as follows. In measurement results that were obtained, a viscosity at 30° C. was read.

Device: AR-G2 (manufactured by TA Instruments Inc.)
Used Plate: Parallel Plate Having Diameter of 25 mm
Plate Gap: 0.5 mm
Measurement Frequency: 10 rad/sec
Temperature Rising Rate: 2.0° C./min
Stress: 300 Pa (Matrix Resin Composition)

Matrix resin compositions used in the examples are as follows.

Resin Composition 1: Prepared by Mixing Epoxy Resin Prepolymer and jER828 at 86.9:13.1 (Unit: parts by mass) as Main Component, and by Performing Heating at 100° C. Such That Viscosity measured in Vicinity of Room Temperature (30° C.) by B Type Viscosimeter Was 35000 Pa·s Resin Composition 2: Prepared by Mixing jER828, TSR-400, and N-740 at 32.5:42.5:25 (Unit: parts by mass) as Main Component, and by Performing Heating at 120° C. Such That Viscosity Measured at 30° C. Was 15000 Pa·s Furthermore, epoxy resins used for preparing the resin composition 1 and the resin composition 2 are as follows.

jER828: Bisphenol A Type Epoxy Resin (Product Name "jER828", manufactured by Mitsubishi Chemical Corporation)

TSR-400: Epoxy Resin Having Oxazolidone Cyclic Skeleton (Product Name "EPICLON TSR-400", manufactured by DIC Corporation)

N-740: Phenol Novolac-Type Epoxy Resin (Product Name "EPICLON N-740", manufactured by DIC Corporation)

(Reinforced Fiber Bundle)

Reinforced fiber bundles used in the examples are as follows.

Carbon Fiber Bundle 1: 34-700 24K Having 24,000 Filaments (manufactured by Mitsubishi Chemical Carbon Fiber and Composites, Inc.) (Tensile Strength of 4830 MPa and Tensile Modulus of 234 GPa)

Carbon Fiber Bundle 2: PYROFIL™ TRW40 50 L Having 50,000 Filaments (manufactured by Mitsubishi Chemical Corporation) (Tensile Strength of 4120 MPa and Tensile Modulus of 240 GPa)

Carbon Fiber Bundle 3: TR50S Having 15,000 Filaments (manufactured by Mitsubishi Chemical Corporation) (Tensile Strength of 4900 MPa and Tensile Modulus of 240 GPa)

<1. Manufacturing of Prepreg Sheet>

Example 1

A resin composition 1 was heated and impregnated in a carbon fiber bundle 1, and thus, a prepreg tape 1 was obtained in which a resin content was 34 mass % (the width of the tape (also referred to as a "the width of a tow") of 6.4 mm). The prepreg tape 1 corresponds to the tow prepreg described above.

A release sheet having a width of 600 mm was wound in a drum wind machine provided with a drum having a circumference of 3.14 m, and the drum was heated such that the surface of a release sheet was 50° C. A unit layer in which a plurality of prepreg tapes 1 were laid in parallel by being separated from each other such that the width of a gap between the adjacent prepreg tapes was 0.1 mm was prepared thereon, and was collected from the drum wind machine, and thus, a sheet of the unit layer was obtained. Such an operation was repeated, and thus, a plurality of unit layers were prepared. The unit layer of 3.14 m was cut to have a length of 600 mm, and thus, a two-layer laminated sheet was obtained in which prepreg tapes laminated each other to be orthogonal to each other. Subsequently, the sheet passed through a fusing press ("JR-600S" manufactured by Asahi Garment Machinery co., ltd.) once in a condition of a cylinder pressure of 0.1 MPa, a feed rate of 0.9 m/min, and a roll temperature of 50° C., and thus, a prepreg sheet of Example 1 was produced. The width of the gap in the prepreg sheet of Example 1 was 1.6% of the width of the tow. In addition, orientation directions of the prepreg tapes in each of the unit layers were orthogonal to each other at 0°/90°.

Example 2

A prepreg sheet of Example 2 was manufactured by the same method as that of Example 1, except that the width of the gap in the prepreg sheet was 9.4% of the width of the tow.

Example 3

A resin composition 2 was heated and impregnated in a carbon fiber bundle 2, and thus, a prepreg tape 2 (the width of a tow of 11.2 mm) was obtained as with Example 1. A prepreg sheet of Example 3 was manufactured by the same method as that of Example 1, except that the prepreg tapes were laid by being separated from each other such that the width of the gap between the adjacent prepreg tapes was 0.2 mm. The width of the gap in the prepreg sheet of Example 3 was 1.8% of the width of the tow.

Example 4

The resin composition 1 was heated and impregnated in the carbon fiber bundle 2, and thus, a prepreg tape 3 was obtained in which a resin content was 34 mass %. A prepreg sheet of Example 4 was manufactured by the same method as that of Example 1, except that the prepreg tapes were laid by being separated from each other such that the width of the gap between the adjacent prepreg tapes was 1 mm. The width of the gap in the prepreg sheet of Example 4 was 8.9% of the width of the tow.

Example 5

A prepreg sheet of Example 5 was manufactured by the same method as that of Example 2, except for a three-layer laminate in which the orientation directions of the prepreg tapes in each of the unit layers of the prepreg sheet intersected with each other at 60°/−60°/0°.

Comparative Example 1

A prepreg sheet of Comparative Example 1 was manufactured by the same method as that of Example 1, except that the width of the gap in the prepreg sheet was 0.0% of the width of the tow.

Comparative Example 2

A prepreg sheet of Comparative Example 2 was manufactured by the same method as that of Example 1, except that the width of the gap in the prepreg sheet was 15.6% of the width of the tow.

Comparative Example 3

A prepreg sheet of Comparative Example 3 was manufactured by the same method as that of Example 1, except that the width of the gap in the prepreg sheet was 100.0% of the width of the tow.

Comparative Example 4

A prepreg sheet of Comparative Example 4 was manufactured by the same method as that of Example 3, except that the width of the gap in the prepreg sheet was 0.0% of the width of the tow.

Comparative Example 5

A prepreg sheet of Comparative Example 5 was manufactured by the same method as that of Example 3, except that the width of the gap in the prepreg sheet was 13.4% of the width of the tow.

Comparative Example 6

A prepreg sheet of Comparative Example 6 was manufactured by the same method as that of Example 5, except that the width of the gap in the prepreg sheet was 0.0% of the width of the tow.

Comparative Example 7

A prepreg sheet of Comparative Example 7 was manufactured by the same method as that of Example 5, except that the width of the gap in the prepreg sheet was 100.0% of the width of the tow.

Comparative Example 8

TR368E250S (manufactured by Mitsubishi Chemical Corporation) that is a unidirectional prepreg was used instead of the prepreg sheet.

<2. Manufacturing of Molded Article>

The prepreg sheets of Examples 1 to 5 and Comparative Examples 1 to 8 were debulked, preformed, trimmed, and heated and pressurized as follows, and thus, molded articles were manufactured.

(Debulking)

The prepreg sheet was transported onto a flat working station, the prepreg sheet was covered with a debulk device (a T-7 seal system, manufactured by TORR SCIENCE CO., Ltd.), and the inside was in a reduced-pressure state by a vacuum pump, and thus, the prepreg sheet was debulked. In the reduced-pressure state, a state where a vacuum pressure was 700 mmHg was maintained for 5 minutes. After that, the inside was returned to an atmospheric pressure, and thus, the prepreg sheet that was debulked was obtained.

(Preforming)

The prepreg sheet that was debulked was placed on an opening portion of a female mold having a cavity that was opened on an upper surface, and the prepreg sheet that was debulked was heated to 70° C. by a movable infrared ray heater, and then, a male mold attached to a simple molding machine was lowered, and the prepreg sheet that was debulked was preformed by being interposed between the female mold and the male mold, and thus, a preform having a shape close to a stereoscopic shape of the molded article was produced. Then, the female mold and the male mold were cooled by blowing air to the female mold and the male mold, and then, the male mold was lifted, and the preform was taken out from the cavity of the female mold.

(Cutting)

The preform was placed on a trimming jig, an outer circumference of the preform was fixed, and the preform was cut along a groove of the trimming jig by a cutter, and thus, the preform having the same dimension as the dimension of the molded article was produced.

(Molding)

The obtained preform was coated in advance with a mold release agent, was arranged in a lower mold of a mold of which the temperature was adjusted to 140° C., was interposed between the lower mold and an upper mold of the mold of which the temperature was adjusted to 140° C., and was heated and pressurized, and thus, the preform was cured, and the molded article was obtained. "Frelease 65" (manufactured by NEOS COMPANY LIMITED) was used as the mold release agent.

<3. Evaluation Method of Performance of Prepreg Sheet>

The performance of the prepreg sheets prepared in the examples and the comparative examples was evaluated by a plurality of (four) experienced technicians with the following method.

(1. Sheet Form Retention Properties)

Handling properties in a state where a support body of a release sheet (a protective film) was removed from the prepreg sheet having a size of 600 mm×600 mm were evaluated.

Evaluation results were as follows.

A: A sheet shape was capable of being sufficiently retained only in a region (a restrained region) where the prepreg tapes overlapped each other.

B: The sheet shape was not capable of being retained only in the restrained region.

(2. Stereoscopic Structure Preforming Properties)

The prepreg sheet was preformed, and it was evaluated whether or not it is possible to follow the shape of the mold in accordance with the deformation of the prepreg tape or the slide of the restrained region.

Evaluation results were as follows.

A: The prepreg tape was deformed and/or moved, and thus, followed the shape of the mold.

B: Wrinkles occurred, but the wrinkles were relaxed by the press molding, and thus, were acceptable.

C: The prepreg tape was not sufficiently deformed and/or moved, the wrinkle occurs, and large wrinkles remained even after the press molding.

(3. Disappearance of Gap of Molded Article)

The molded article where a preform having a predetermined thickness formed by laminating and integrating the preformed prepreg sheet was subjected to the press molding was evaluated whether or not the gap between the prepreg tapes provided on the prepreg sheet disappeared by a fiber flow.

Evaluation results were as follows.

A: A reinforced fiber sufficiently flowed by the press molding, and the gap provided on the prepreg sheet was filled (the gap disappeared).

B: The gap in a portion where the gap extended by the preforming, but most of the gaps were filled (most of the gaps disappeared).

C: The reinforced fiber did not sufficiently flow by the press molding, and the gap provided in the prepreg sheet was not filled (the gap did not disappear).

(4. Fiber Meandering in Molded Article)

The evaluation of fiber meandering different from that at the time of preforming was performed. It was evaluated whether or not the reinforced fiber meandered by the resin flow that was locally generated during the press molding in accordance with the shape of the molded article.

Evaluation results were as follows.

A: Reinforced fiber meandering was suppressed.

B: Small meandering of the reinforced fiber occurred.

C: A portion was provided in which the reinforced fiber meandering occurred significantly compared to the surrounds.

(5. Comprehensive Evaluation of Mold Workability and Molded Product)

The evaluation was performed from the wrinkles at the time of preforming and the meandering at the time of molding.

Evaluation results were as follows.

A: The appearance was excellent, or a part of the wrinkles or the meandering was observed, but was acceptable.

B: In each of the evaluation items, there was at least the lowest evaluation (in the sheet form retention properties, "B", and in the other evaluation items, "C"), or there were two or more second lowest evaluations (in the evaluation items other than the sheet form retention properties, "B").

<Results>

The results are shown in Table 1 and Table 2. In the tables, "CF" indicates the carbon fiber bundle, "Wt" indicates the width of the prepreg tape, "Gt" indicates the gap between the prepreg tapes in the unit layer, and "Gt/Wt" indicates a ratio of the gap to the width of the prepreg tape.

TABLE 1

| Example No. | 1 | 2 | 3 | 4 | 5 |
|---|---|---|---|---|---|
| Specification of tow prepreg and unit layer | | | | | |
| CF No. | 1 | 1 | 2 | 2 | 1 |
| Resin composition No. | 1 | 1 | 2 | 1 | 1 |

TABLE 1-continued

| Example No. | 1 | 2 | 3 | 4 | 5 |
|---|---|---|---|---|---|
| Wt [mm] | 6.4 | 6.4 | 11.2 | 11.2 | 6.4 |
| Gt [mm] | 0.1 | 0.6 | 0.2 | 1 | 0.6 |
| Gt/Wt [%] | 1.6 | 9.4 | 1.8 | 8.9 | 9.4 |
| Specification of prepreg sheet | | | | | |
| Laminated configuration | [0/90] | [0/90] | [0/90] | [0/90] | [60/−60/0] |
| Evaluation result | | | | | |
| Sheet form retention properties | A | A | A | A | A |
| Stereoscopic structure preforming properties | A | A | A | A | B |
| Disappearance of gap of molded article | A | B | A | B | A |
| Fiber meandering in molded article | B | A | A | A | A |
| Appearance of molded article | A | A | A | A | A |

TABLE 2

| | Comparative Example No. | | | | | | | |
|---|---|---|---|---|---|---|---|---|
| | 1 | 2 | 3 | 4 | 5 | 6 | 7 | 8 |
| Specification of tow prepreg and unit layer | | | | | | | | |
| CF No. | 1 | 1 | 1 | 2 | 2 | 1 | 1 | TR368E250S |
| Resin composition No. | 1 | 1 | 1 | 2 | 2 | 1 | 1 | — |
| Wt [mm] | 6.4 | 6.4 | 6.4 | 11.2 | 11.2 | 6.4 | 6.4 | — |
| Gt [mm] | 0 | 1 | 6.4 | 0 | 1.5 | 0 | 6.4 | — |
| Gt/Wt [%] | 0.0 | 15.6 | 100.0 | 0.0 | 13.4 | 0.0 | 100.0 | — |
| Specification of prepreg sheet | | | | | | | | |
| Laminated configuration | [0/90] | [0/90] | [0/90] | [0/90] | [0/90] | [60/−60/0] | [60/−60/0] | [0/90] |
| Evaluation result | | | | | | | | |
| Sheet form retention properties | A | A | B | A | A | A | A | A |
| Stereoscopic structure preforming properties | B | A | A | B | A | C | A | C |
| Disappearance of gap of molded article | — | C | C | — | C | — | C | — |
| Fiber meandering in molded article | B | A | C | C | A | B | C | — |
| Appearance of molded article | B | B | B | B | B | B | B | — |

In Comparative Example 3 and Comparative Example 7, in the evaluation of the fiber meandering of the molded article, a significant flow of the fiber (a fiber overflow) was observed. In addition, in Comparative Example 8, there were deep wrinkles in the prepared preform, and the molding was difficult, and thus, the fiber meandering of the molded article was not capable of being evaluated.

Example 6

The resin composition 1 was heated and impregnated in a carbon fiber bundle 3, and thus, a prepreg tape 6 was obtained in which the width of a tow was 12.7 mm, and a resin content was 36 mass %. A two-layer laminated sheet was obtained as with Example 1, except that the prepreg tape 6 was used instead of the prepreg tape 1, and the width of the gap between the adjacent prepreg tapes was changed to 0.127 mm. The width of the gap in a prepreg sheet of Example 6 was 1.0% of the width of the tow.

Further, a preform was prepared as with Example 1 except that the prepreg sheet of Example 6 was used instead of the prepreg sheet of Example 1. The obtained preforms were laminated by overlapping each other to have a laminated configuration of [0°/90°]$_5$ and to include ten unit layers in total, and then, were subjected to the press molding, and thus, a molded article was obtained.

Example 7

A prepreg tape 7 was obtained as with the prepreg tape 6, except that the width of the tow was set to 30.0 mm. A two-layer laminated sheet was obtained as with Example 1, except that the prepreg tape 7 was used instead of the prepreg tape 1, and the width of the gap between the adjacent prepreg tapes was changed to 0.30 mm. The width of the gap in a prepreg sheet of Example 7 was 1.0% of the width of the tow.

Further, a preform was prepared as with Example 6, except that the prepreg sheet of Example 7 was used instead of the prepreg sheet of Example 1, and a molded article was obtained.

Example 8

A two-layer laminated sheet and a prepreg sheet of Example 8 were produced as with Example 7, except that the width of the gap between the adjacent prepreg tapes was changed to 0.15 mm. The width of the gap in the prepreg sheet of Example 8 was 0.5% of the width of the tow.

Further, A preform was prepared as with Example 6, except that the prepreg sheet of Example 8 was used instead of the prepreg sheet of Example 1, and a molded article was obtained.

As with Examples 1 to 5 and Comparative Examples 1 to 8, in each of the prepreg sheets of Examples 6 to 8, the form retention properties and the stereoscopic structure preforming properties of the sheet were evaluated. Further, in each of the prepreg sheets of Examples 6 to 8, the wrinkles and the fiber meandering in the center portion were evaluated on the basis of the following standards.

[Evaluation Standard of Wrinkles in Center Portion]

A: The prepreg tape was sufficiently deformed and moved, and thus, the wrinkles were not observed in the center portion of the prepreg sheet.

B: Some wrinkles were confirmed in the center portion of the prepreg sheet, but the wrinkles were relaxed by the press molding.

C: Deep and strong wrinkles occurred in the center portion of the prepreg sheet, and the implementation of the press molding was difficult.

[Fiber Meandering]

A: The fiber meandering or the twist of the fiber at the time of preforming the prepreg sheet was not observed.

B: Slight fiber meandering or slight twist of the fiber at the time of preforming the prepreg sheet was observed, but was acceptable.

C: Extreme fiber meandering or extreme twist of the fiber was observed at the time of preforming the prepreg sheet.

Further, as with Examples 1 to 5 and Comparative Examples 1 to 8, in each of the molded articles of Examples 6 to 8, the disappearance of the gap of the molded article, the fiber meandering in the molded article, molding workability, and comprehensive evaluation of the molded product were evaluated, and the disappearance of the gap of the molded article and the fiber meandering in the molded article were evaluated on the basis of the following standards. The molding workability and the comprehensive evaluation of the molded product were evaluated on the basis of the following standards.

[Evaluation Standard of Molding Workability and Comprehensive Evaluation of Molded Product]

A: The appearance was excellent, or a part the wrinkles or the meandering was observed, but was acceptable.

B: The appearance was excellent, but the wrinkles or the meandering was remarkable, or the wrinkles or the meandering were suppressed, but there was a problem in the appearance, within a practicable range.

C: In each of the evaluation items, there was at least the lowest evaluation (in the sheet form retention properties, "B", and in the other evaluation items, "C"), or there were two or more second lowest evaluations (in the evaluation items other than the sheet form retention properties, "B").

<Results>

The evaluation results of Examples 6 to 8 are shown in Table 3.

[Table 3]

TABLE 3

| Example No. | 6 | 7 | 8 |
|---|---|---|---|
| Specification of tow prepreg and unit layer | | | |
| CF No. | 3 | 3 | 3 |
| Resin composition No. | 3 | 3 | 3 |
| Wt [mm] | 12.7 | 30.0 | 30.0 |
| Gt [mm] | 0.127 | 0.30 | 0.15 |
| Gt/Wt [%] | 1.0 | 1.0 | 0.5 |
| Specification of prepreg sheet | | | |
| Laminated configuration | [0/90]s | [0/90]s | [0/90]s |
| Evaluation result | | | |
| Sheet form retention properties | A | A | A |
| Stereoscopic structure preforming properties | A | A | A |
| Wrinkles in center portion | A | B | A |
| Fiber meandering in preforming | A | A | A |
| Disappearance of gap of molded article | A | A | A |
| Fiber meandering in molded article | A | A | A |
| Appearance of molded article | B | B | B |

Example 9

The matrix resin composition 2 was heated and impregnated in the carbon fiber bundle 2, and thus, the prepreg tape 2 (the width of a tow 11.2 mm) was obtained in which a resin content was 34 mass %. On the other hand, a polyethylene flexible film having a thickness of 20 μm was fixed onto a working station including a vacuum chuck mechanism in a reduced-pressure state.

The obtained prepreg tape 2 was crimped to the flexible film that was fixed in a reduced-pressure state by a handheld roll, while performing heating to 30° C. to 80° C. by a handheld infrared ray heater. At this time, the prepreg tape 2 was pulled out from the roll while applying a tensile force of approximately 10 N to the prepreg tape 2. In addition, the prepreg tapes 2 were separated from each other such that the width of the gap between the adjacent prepreg tapes was 0.1 mm, and were laid on the flexible film.

A unit layer in which a plurality of prepreg tapes 2 were laid in parallel was prepared by the method described above, and the fixing in a reduced-pressure state was released, and thus, a s unit layer with a covering material of Example 9 was obtained. The width of the gap between the prepreg tapes in the unit layer was 1.8% of the width of the tow.

Example 10

A unit layer with a covering material of Example 10 was manufactured by the same method as that of Example 9, except that the width of the gap in the prepreg sheet was set to 1 mm, and was 8.9% of the width of the tow.

Example 11

A unit layer with a covering material of Example 11 was manufactured by the same method as that of Example 9, except that a Teflon (Registered Trademark) film having a thickness of approximately 200 μm was used as the flexible film.

<Results>

In Examples 9 and 10, the form was retained by the flexible film, and thus, an excellent unit layer of the prepreg tape with less wrinkles was obtained. On the other hand, in Example 11, at the moment when the flexible film was removed from a vacuum chuck, large wrinkles occurred in the unit layer along with the contraction of the film. It is considered that this is because the contraction of the film occurs by the inner stress of the film that is generated at the time of laying the prepreg tape. From Example 11, it is known that in a case where the thickness of the flexible sheet excessively increases, the inner stress that causes large deformation in the unit layer may be generated.

INDUSTRIAL APPLICABILITY

According to one aspect of the invention, it is possible to provide the prepreg sheet that is capable of suppressing the occurrence of the wrinkles and the reinforced fiber meandering at the time of molding, and is excellent in the molding properties. In particular, the prepreg sheet according to one aspect of the invention can be preferably used for manufacturing the molded article having a complicated structure such as an automobile component.

EXPLANATIONS OF LETTERS OR NUMERALS 1, 1a PREPREG SHEET
2 LAMINATE
9, 12 PREFORM
10a, 10b, 10c UNIT LAYER
100a, 100b, 100c, 100d, 100e, 100f, 100g, 100h PREPREG TAPE

The invention claimed is:

1. A prepreg sheet formed by laminating a plurality of unit layers comprising a plurality of arranged prepreg tapes in which a matrix resin composition is impregnated in a reinforced fiber bundle,
wherein at least one unit layer has a gap between the adjacent prepreg tapes, and
a width of the gap is from 0.1% to 10% of the width of adjacent prepreg tapes whichever is narrower, and
in a temperature rising viscosity measurement in which the matrix resin composition is subjected to temperature rising at 2.0° C./minute, a lowermost viscosity is from 0.3 Pa·s to 20 Pa·s.

2. The prepreg sheet according to claim 1,
wherein at least one unit layer comprises a prepreg tape oriented in a direction intersecting with an orientation direction of at least one prepreg tape included in the unit layer directly above or directly below.

3. The prepreg sheet according to claim 1,
wherein the prepreg tapes of each of the unit layers comprise a region that does not overlap the prepreg tape of the unit layer directly above or directly below, in a lateral end portion.

4. The prepreg sheet according to claim 1, wherein the prepreg tapes in the unit layer are arranged in parallel.

5. A method for manufacturing a fiber-reinforced composite by molding the prepreg sheet or a laminate of a plurality of the prepreg sheets of claim 1, the method comprising:
preforming one prepreg sheet or a laminate of two or more prepreg sheets into a shape closer to a shape of a molded article than a shape of the prepreg sheet, thereby preparing a preform; and
molding the preform comprising curing the preform by heating and pressurizing the preform in a mold heated to a temperature higher than or equal to a curing temperature of the matrix resin composition.

6. The method for manufacturing a fiber-reinforced composite according to claim 5, wherein in the preforming, two to four prepreg sheets are laminated.

7. The method for manufacturing a fiber-reinforced composite according to claim 5, wherein in the molding, a plurality of preforms are cured by heating and pressurizing in the mold.

8. The method for manufacturing a fiber-reinforced composite according to claim 5,
wherein in the preforming, when two or more prepreg sheets are laminated with each other, a first prepreg sheet and a second prepreg sheet are laminated with each other to be preformed such that all orientation directions of the prepreg tapes of the first prepreg sheet are different from all orientation directions of the prepreg tapes of the second prepreg sheet directly below.

9. The method for manufacturing a fiber-reinforced composite according to claim 5, further comprising:
debulking the prepreg sheet before the preforming.

10. A fiber-reinforced composite obtained by the method for manufacturing a fiber-reinforced composite according to claim 5.

11. A fiber-reinforced composite in which the prepreg sheet of claim 1 is cured.

12. The prepreg sheet according to claim 1, wherein a temperature range in which the lowermost viscosity is exhibited is from 100° C. to 120° C.

13. A unit layer comprising a covering material, comprising:
the covering material; and
a unit layer that is arranged on the covering material,
wherein the unit layer comprises a plurality of arranged prepreg tapes having a gap,
the prepreg tapes comprise a reinforced fiber bundle and a matrix resin composition, and
a width of the gap is from 0.1% to 10% of the width of the adjacent prepreg tapes whichever is narrower, and
in a temperature rising viscosity measurement in which the matrix resin composition is subjected to temperature rising at 2.0° C./minute, a lowermost viscosity is from 0.3 Pa·s to 20 Pa·s.

14. A method for manufacturing a fiber-reinforced composite, the method comprising:
taking-out by peeling off the covering material from the unit layer comprising the covering material of claim 13, and taking out the unit layer;
preforming one prepreg sheet or a laminate of two or more prepreg sheets into a shape closer to a shape of a molded article than a shape of the prepreg sheet, and preparing a preform; and
molding the preform by curing the preform by heating and pressurizing in a mold heated to a temperature higher than or equal to a curing temperature of the matrix resin.

15. A fiber-reinforced composite obtained by the method for manufacturing a fiber-reinforced composite according to claim 14.

16. The unit layer with a covering material according to claim 13, wherein a temperature range in which the lowermost viscosity is exhibited is from 100° C. to 120° C.

17. A method for manufacturing a prepreg sheet, the method comprising:
repeating forming a unit layer by arranging a plurality of prepreg tapes in which a matrix resin composition is impregnated in a reinforced fiber bundle,
in the repeating forming a unit layer, arranging a prepreg tape to have a gap between the adjacent prepreg tapes, and orienting the prepreg tape in a direction intersecting with an orientation direction of the prepreg tape of another unit layer, at least one time,
wherein a width of the gap is from 0.1% to 10% of the width of the adjacent prepreg tapes whichever is narrower, and
in a temperature rising viscosity measurement in which the matrix resin composition is subjected to temperature rising at 2.0° C./minute, a lowermost viscosity is from 0.3 Pa·s to 20 Pa·s.

18. The method for manufacturing a prepreg sheet according to claim 17, wherein a temperature range in which the lowermost viscosity is exhibited is from 100° C. to 120° C.

* * * * *